(12) United States Patent
Ando et al.

(10) Patent No.: US 8,972,089 B2
(45) Date of Patent: Mar. 3, 2015

(54) HYBRID VEHICLE

(71) Applicants: Daigo Ando, Nagoya (JP); Yukio Kobayashi, Kasugai (JP)

(72) Inventors: Daigo Ando, Nagoya (JP); Yukio Kobayashi, Kasugai (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 134 days.

(21) Appl. No.: 13/777,196

(22) Filed: Feb. 26, 2013

(65) Prior Publication Data
US 2013/0226380 A1 Aug. 29, 2013

(30) Foreign Application Priority Data
Feb. 28, 2012 (JP) .................................. 2012-041032

(51) Int. Cl.
| | | |
|---|---|---|
| B60W 20/00 | (2006.01) | |
| B60W 10/06 | (2006.01) | |
| B60W 10/08 | (2006.01) | |
| F02D 41/22 | (2006.01) | |
| F02D 41/30 | (2006.01) | |
| F02N 11/08 | (2006.01) | |

(52) U.S. Cl.
CPC .............. B60W 20/108 (2013.01); B60W 10/06 (2013.01); B60W 10/08 (2013.01); F02D 41/221 (2013.01); F02D 41/3094 (2013.01); F02N 11/0814 (2013.01); Y10S 903/93 (2013.01); Y02T 10/6286 (2013.01); F02D 2041/224 (2013.01); Y02T 10/48 (2013.01)
USPC ......... 701/22; 123/521; 123/179.3; 290/40 C; 903/930

(58) Field of Classification Search
CPC ..... B60W 20/00; B60W 10/08; B60W 10/06; Y02T 10/6286; B60K 6/445

USPC ................. 701/22, 112; 123/521, 233, 179.3
See application file for complete search history.

(56) References Cited

U.S. PATENT DOCUMENTS

| | | | |
|---|---|---|---|
| 6,131,680 A | 10/2000 | Nii et al. | |
| 2003/0102175 A1* | 6/2003 | Wakashiro et al. | 180/65.4 |
| 2007/0101806 A1 | 5/2007 | Yamaguchi | |
| 2007/0289577 A1* | 12/2007 | Yamaguchi et al. | 123/446 |
| 2010/0241297 A1 | 9/2010 | Aoki et al. | |
| 2012/0197471 A1* | 8/2012 | Irisawa | 701/22 |
| 2013/0173103 A1 | 7/2013 | Ando et al. | |

FOREIGN PATENT DOCUMENTS

| | | |
|---|---|---|
| JP | 09308012 A | 11/1997 |
| JP | 2005-226553 A | 8/2005 |
| JP | 2007030710 A | 2/2007 |

(Continued)

*Primary Examiner* — Helal A Algahaim
*Assistant Examiner* — Jelani Smith
(74) *Attorney, Agent, or Firm* — Gifford, Krass, Sprinkle, Anderson & Citkowski, P.C.

(57) ABSTRACT

A hybrid vehicle having a controller controls output torque of an engine and output torque of a generator motor so as to apply requested torque to a drive shaft. The controller performs engine intermittent operation to stop operation of the engine when a given engine operation stop condition is satisfied, and start the engine when a given engine start condition is satisfied. The controller makes an in-cylinder injection valve abnormality determination while causing a total amount of fuel to be injected from an in-cylinder injection valve, and makes a port injection valve abnormality determination while causing the total amount of fuel to be injected from a port injection valve. If at least one of abnormality determinations concerning the in-cylinder injection valve and the port injection valve has not been made, the engine is operated so that the load of the engine falls within a predetermined range.

4 Claims, 10 Drawing Sheets

(56) References Cited

FOREIGN PATENT DOCUMENTS

| | | |
|---|---|---|
| JP | 2007-168523 A | 7/2007 |
| JP | 2009-126450 A | 6/2009 |
| JP | 2012-036767 A | 2/2012 |
| JP | 2013-139181 A | 7/2013 |

\* cited by examiner

HYBRID VEHICLE

INCORPORATION BY REFERENCE

The disclosure of Japanese Patent Application No. 2012-041032 filed on Feb. 28, 2012 including the specification, drawings and abstract is incorporated herein by reference in its entirety.

BACKGROUND OF THE INVENTION

1. Field of the Invention

The invention relates to a hybrid vehicle that has an internal combustion engine including in-cylinder injection valves and port injection valves, and an electric motor, as driving sources (power sources), and runs while controlling output torque of the driving sources.

2. Description of Related Art

A hybrid vehicle is equipped with an internal combustion engine and an electric motor, as driving sources that generate driving force for running the vehicle. Namely, the hybrid vehicle runs with torque generated by at least one of the engine and the electric motor and transmitted to a drive shaft connected to driving wheels of the vehicle.

In some cases, the hybrid vehicle is equipped with an internal combustion engine including a fuel injection valve (in-cylinder injection valve) that directly injects fuel into a combustion chamber of each cylinder, and a fuel injection valve (port injection valve) that injects fuel into an intake port that communicates with the combustion chamber. One type of the hybrid vehicle equipped with the engine including the in-cylinder injection valve and the port injection valve for each cylinder is adapted to run in a selected one of a port injection drive mode, an in-cylinder injection drive mode, and a both-injector drive mode, in order to make various diagnoses of malfunctions (see, for example, Japanese Patent Application Publication No. 2005-226553 (JP 2005-226553 A)). In the port injection drive mode, the total amount of fuel supplied to the engine is injected from the port injection valve. In the in-cylinder injection mode, the total amount of fuel supplied to the engine is injected from the in-cylinder injection valve. In the both-injector drive mode, fuel is injected from both the in-cylinder injection valve and the port injection valve.

One type of the hybrid vehicle in the related art has a system that determines power required to be generated by the engine (required engine power), based on torque determined according to the amount of accelerator operation by the user (user-requested torque required to be applied to the drive shaft of the vehicle). Furthermore, the system of the hybrid vehicle of the related art controls the engine so that the engine generates power that satisfies the required engine power, while assuring the optimum operating efficiency. In this case, the system controls the electric motor so that the motor generates output torque that makes up for a shortage of output torque of the engine transmitted to the drive shaft, relative to the user-requested torque.

When the user-requested torque is small (accordingly, the required engine power is small), and therefore, the engine is not able to operate at an efficiency equal to or higher than a given efficiency (when an engine operation stop condition is satisfied), the system of the hybrid vehicle of the related art stops operation of the engine, so that the user-requested torque is satisfied or provided solely by output torque of the electric motor. When the user-requested torque increases (accordingly, the required engine power increases) in a condition where the operation of the engine is stopped, and therefore, the engine becomes able to operate at an efficiency equal to or higher than the given efficiency (when an engine start condition is satisfied), the system of the known hybrid vehicle starts the engine, so that the user-requested torque is satisfied or provided by output torque of the engine and output torque of the motor. Thus, since the engine is stopped and started in this manner, or intermittently operated, the above operation of the engine is also called "intermittent operation" or "engine intermittent operation".

In the engine as described above, it is desirable to make a determination (in-cylinder injection valve abnormality determination) as to whether an abnormality occurs to the in-cylinder injection valve, and make a determination (port injection valve abnormality determination) as to whether an abnormality occurs to the port injection valve. The engine needs to be operated in the above-mentioned in-cylinder injection drive mode in order to make an in-cylinder injection valve abnormality determination. Also, the engine needs to be operated in the above-mentioned port injection drive mode in order to make a port injection valve abnormality determination.

However, if the engine is kept operating in the port injection drive mode in a condition where the load of the engine is relatively high, the temperature in the vicinity of a fuel injection hole (nozzle) of the in-cylinder injection valve becomes excessively high. Accordingly, it is difficult to make a port injection valve abnormality determination when the engine is in a high-load condition.

In a condition where the load of the engine is relatively low, on the other hand, the engine can be kept operating in the port injection drive mode or the in-cylinder injection drive mode, over a relatively long period of time though there is a limit to the period. Accordingly, it is preferable to make an in-cylinder injection valve abnormality determination and a port injection valve abnormality determination (these abnormality determinations will be collectively called "injection valve abnormality determinations"), in a condition where the load of the engine is relatively low.

However, in the hybrid vehicle as described above, the required engine power is small when the load of the engine is small; therefore, the engine cannot be operated at an efficiency that is equal to or higher than the given efficiency, and the operation of the engine is stopped under the intermittent operation. Consequently, chances of making injection valve abnormality determinations are considerably reduced.

It is thus proposed to inhibit the operation of the engine from being stopped under the engine intermittent operation when any injection valve abnormality determination has not been made. However, if the operation of the engine is inhibited from being stopped so as to make an injection valve abnormality determination, the fuel efficiency of the engine (accordingly, the fuel efficiency of the hybrid vehicle) deteriorates.

In the meantime, when a catalyst warm-up request for increasing the temperature of a catalyst provided in an exhaust passage of the engine, a heating request for increasing the temperature within a compartment or cabin of the hybrid vehicle, or the like, is generated, the operation of the engine is inhibited from being stopped under the engine intermittent operation. Namely, in the hybrid vehicle, the operation of the engine may be inhibited from being stopped under the engine intermittent operation, for a purpose different from the purpose of making an injection valve abnormality determination. In the following description, a condition under which the operation of the engine is inhibited from being stopped under the engine intermittent operation, for a purpose different from the purpose of making an injection valve abnormality determination, will be called "general intermittent-operation inhibiting condition". If an injection valve abnormality determination can be made during a period in which the general intermittent-operation inhibiting condition is satisfied, deterioration of the fuel efficiency may be reduced.

However, the frequency at which any general intermittent-operation inhibiting condition is satisfied is not so high. Furthermore, even if the general intermittent-operation inhibiting condition is satisfied, an injection valve abnormality determination cannot be made for the reason as described above if the engine is in an operation condition in which the load is relatively large, for example. Consequently, a problem of a delay in making an injection valve abnormality determination may arise again.

SUMMARY OF THE INVENTION

The invention provides a hybrid vehicle in which an engine is operated so that the load of the engine falls within a predetermined load range during a period in which a general intermittent-operation inhibiting condition is satisfied, so that an injection valve abnormality determination can be made at an early opportunity, without significantly deteriorating the fuel efficiency.

A hybrid vehicle according to one aspect of the invention includes an internal combustion engine, an electric motor, a power transmission mechanism, a driving force control unit, and an abnormality determining unit.

The internal combustion engine includes an in-cylinder injection valve that directly injects fuel into a combustion chamber, and a port injection valve that injects the fuel into an intake port communicating with the combustion chamber. The power transmission mechanism couples a drive shaft of the hybrid vehicle with the internal combustion engine so that torque can be transmitted therebetween, and couples the drive shaft with the electric motor so that torque can be transmitted therebetween.

The driving force control unit performs normal operation to control output torque of the internal combustion engine and output torque of the electric motor so as to apply torque required to be applied to the drive shaft, which is determined according to an amount of accelerator operation by a user, to the drive shaft.

In addition, the driving force control unit performs engine intermittent operation to stop operation of the internal combustion engine and control the output torque of the electric motor so that the required torque is applied to the drive shaft when determining that a given condition for stopping operation of the internal combustion engine is satisfied, and start the internal combustion engine when determining that a given condition for starting the internal combustion engine is satisfied.

The abnormality determining unit makes an in-cylinder injection valve abnormality determination as to whether an abnormality occurs to the in-cylinder injection valve while causing a total amount of fuel included in an air-fuel mixture supplied to the internal combustion engine to be injected from the in-cylinder injection valve. Further, the abnormality determining unit makes a port injection valve abnormality determination as to whether an abnormality occurs to the port injection valve while causing the total amount of fuel included in the air-fuel mixture to be injected from the port injection valve.

The driving force control unit includes an intermittent operation inhibiting unit that inhibits execution of the engine intermittent operation and keeps operating the internal combustion engine when a given condition for inhibiting execution of the engine intermittent operation is satisfied, and an operation executing unit, which operates the internal combustion engine so that a load of the internal combustion engine falls within a predetermined range, when at least one of the in-cylinder injection valve abnormality determination and the port injection valve abnormality determination has not been made, during a period in which execution of the engine intermittent operation is inhibited whereby the internal combustion engine is kept operating.

In this case, the abnormality determining unit makes the in-cylinder injection valve abnormality determination and the port injection valve abnormality determination, when the load of the internal combustion engine falls within the predetermined range.

Other objects, features and associated advantages will be easily understood from description of each embodiment of the invention, which will be described with reference to the drawings.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A hybrid vehicle according to one embodiment of the invention will be described with reference to the drawings.

Figure 1:
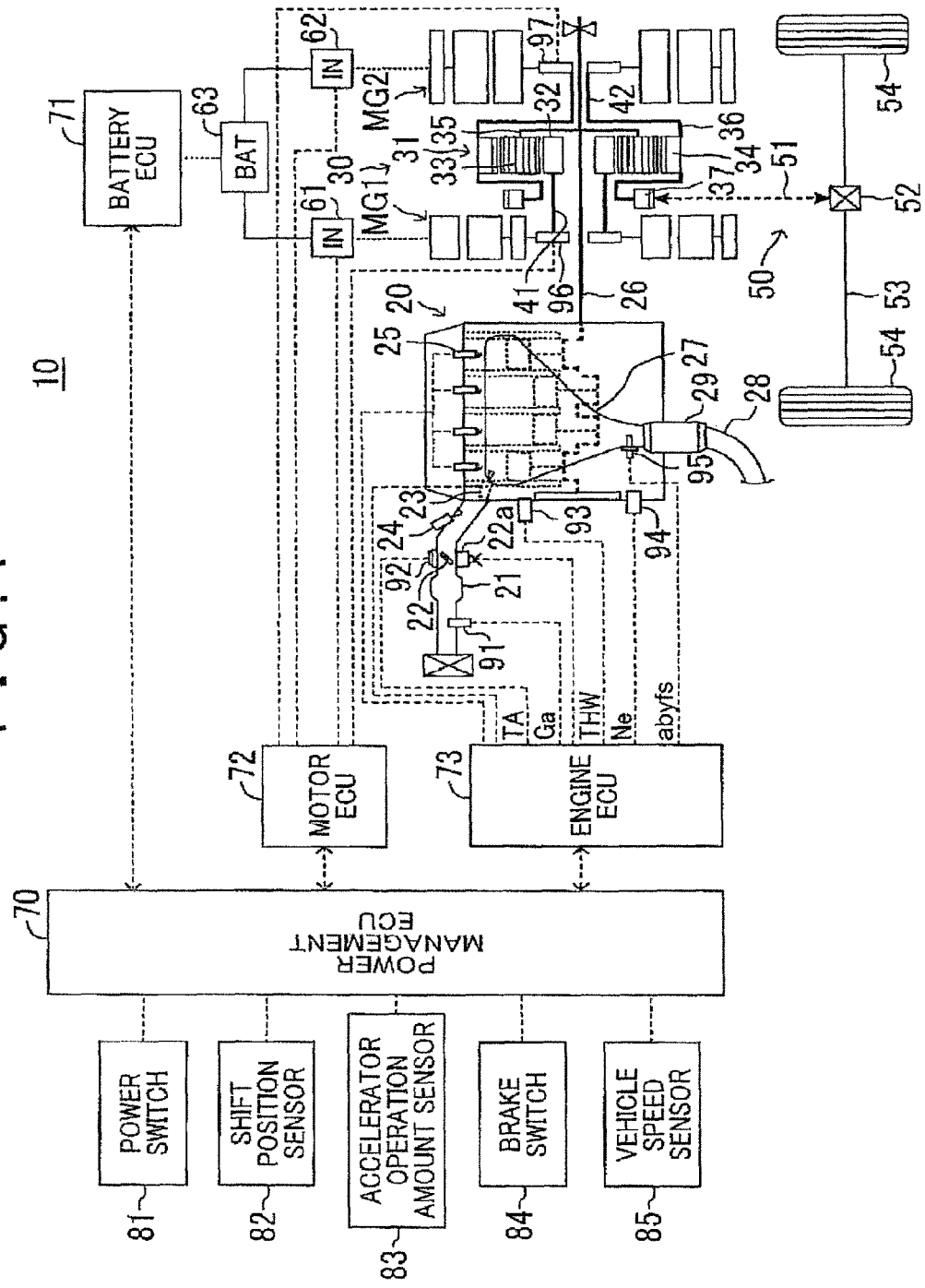
FIG. 1 is a schematic view of a hybrid vehicle according to one embodiment of the invention.

As shown in FIG. 1, the hybrid vehicle 10 according to the embodiment of the invention includes a first generator motor MG1, second generator motor MG2, internal combustion engine 20, power split device 30, driving force transmission mechanism 50, first inverter 61, second inverter 62, battery 63, power management ECU 70, battery ECU 71, motor ECU 72, and an engine ECU 73. The ECU, which stands for "Electronic Control Unit", is an electronic control circuit having a microcomputer including a central processing unit (CPU), read only memory (ROM), random access memory (RAM), interfaces, etc., as a main constituent component.

The first generator motor (motor-generator) MG1 is a synchronous generator motor that can function as a generator and an electric motor. In this embodiment, the first generator motor MG1 mainly functions as a generator. The first generator motor MG1 includes an output shaft (which will also be called "first shaft") 41.

Like the first generator motor MG1, the second generator motor (motor-generator) MG2 is a synchronous generator motor that can function as a generator and an electric motor. In this embodiment, the second generator motor MG2 mainly functions as an electric motor. The second generator motor MG2 includes an output shaft (which will also be called "second shaft") 42.

The engine 20 is a four-cycle, spark-ignition, multi-cylinder internal combustion engine. The engine 20 includes an intake passage section 21 including an intake pipe and an intake manifold, a throttle valve 22, a throttle-valve actuator 22a, a plurality of in-cylinder injection valves 23, a plurality of port injection valves 24, a plurality of ignition devices 25 including ignition plugs, a crankshaft 26 as an output shaft of the engine 20, an exhaust manifold 27, an exhaust pipe 28, and an upstream-side three-way catalyst 29. The engine 20 may include a variable intake valve control device (VVT) and a downstream-side three-way catalyst, which are not illustrated in the drawings.

The throttle valve 22 is rotatably supported in the intake passage section 21. The throttle-valve actuator 22a rotates the throttle valve 22 in response to a command signal from the engine ECU 73, so that the throttle-valve actuator 22a can change the cross-sectional area of the intake passage section 21.

Figure 2:
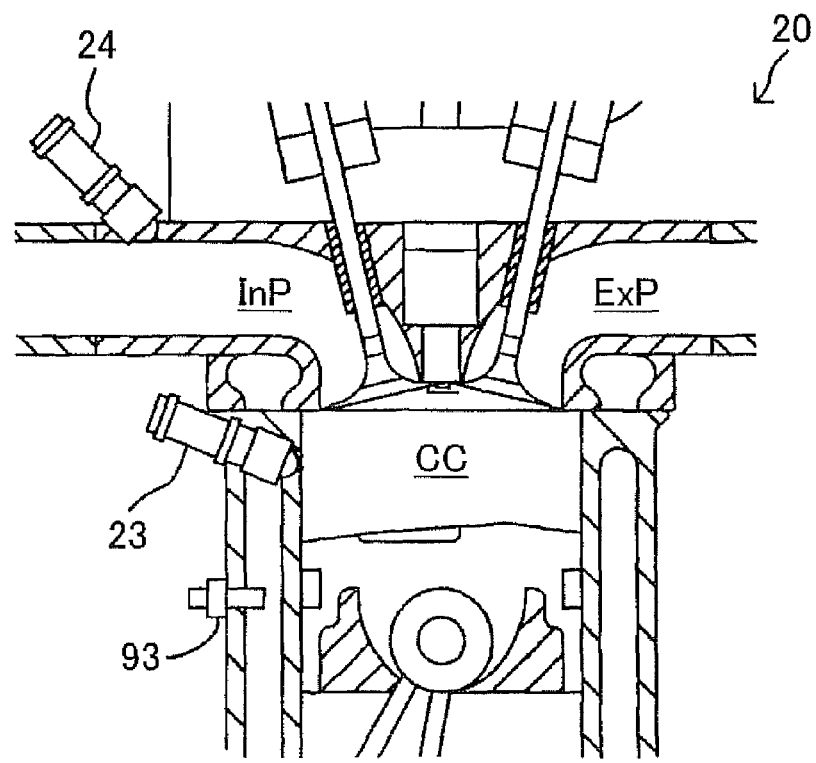
FIG. 2 is a cross-sectional view of a part of a particular cylinder of an internal combustion engine shown in FIG. 1.

Each of the in-cylinder injection valves 23 (only one of which is shown in FIG. 1 and FIG. 2) is positioned such that an injection hole of the in-cylinder injection valve 23 is exposed to a corresponding combustion chamber CC, as shown in the enlarged view of FIG. 2. Each in-cylinder injection valve 23 is operable to directly inject fuel into the combustion chamber CC of each cylinder, in response to an in-cylinder fuel injection command signal, so that the fuel is injected in a specified in-cylinder fuel injection amount Fd included in the in-cylinder fuel injection command signal. The in-cylinder injection valve 23 is also called "in-cylinder fuel injection valve or direct fuel injection valve".

Each of the port injection valves 24 (only one of which is shown in FIG. 1 and FIG. 2) is positioned such that an injection hole of the port injection valve 24 is exposed to an intake port InP that communicates with the combustion chamber CC, as shown in the enlarged view of FIG. 2. Each port injection valve 24 is operable to inject fuel into the intake port InP, in response to a port fuel injection command signal, so that the fuel is injected in a specified port fuel injection amount Fp included in the port fuel injection command signal. The port injection valve 24 is also called "port fuel injection valve".

An air-flow meter 91 measures the intake air amount Ga. The engine ECU 73 calculates an in-cylinder intake air amount Mc as an amount of intake air to be drawn into one cylinder, based on the intake air amount Ga and the engine speed Ne. Subsequently, the engine ECU 73 determines the amount of fuel (which will be called "total fuel amount Ft") to be supplied to the engine 20, according to the in-cylinder intake air amount Mc. Further, the engine ECU 73 determines the proportion of the specified in-cylinder fuel injection amount Fd and the specified port fuel injection amount Fp, based on operating conditions of the engine 20. The engine ECU 73 determines the specified in-cylinder fuel injection amount Fd and the specified port fuel injection amount Fp, according to the proportion and the total fuel amount Ft.

Each of the ignition devices 25 including the ignition plugs is operable to produce a spark for ignition at a given time in the combustion chamber of each cylinder, in response to a command signal from the engine ECU 73.

The upstream-side three-way catalyst 29, which is a catalyst for purifying exhaust gas, is placed in an exhaust collecting portion of the exhaust manifold 27. Namely, the catalyst 29 is provided in an exhaust passage of the engine 20. The catalyst 29 serves to treat (convert or remove) unburned substances (e.g., hydrocarbon (HC), carbon monoxide (CO) and nitrogen oxides (NOx) emitted from the engine 20.

In the engine 20, the throttle-valve actuator 22a changes the opening of the throttle valve 22 so as to change the intake air amount and also change the total fuel amount Ft. In this manner, the output torque and engine speed (accordingly, engine output or power) of the engine 20 can be changed.

The power split device 30 includes a known planetary gear set 31. The planetary gear set 31 includes a sun gear 32, two or more planetary gears 33, and a ring gear 34.

The sun gear 32 is connected to the first shaft 41 of the first generator motor MG1. Accordingly, the first generator motor MG1 can generate torque to the sun gear 32. Also, the first generator motor MG1 can be rotated and driven with torque transmitted from the sun gear 32 to the first generator motor MG1 (the first shaft 41). The first generator motor MG1 can generate electric power when it is rotated and driven with torque transmitted from the sun gear 32 to the first generator motor MG1.

Each of the planetary gears 33 meshes with the sun gear 32 and the ring gear 34. Rotary shafts (the rotational axes) of the planetary gears 33 are provided on the planetary carrier 35. The planetary carrier 35 is held in position such that it is rotatable coaxially with the sun gear 32. Accordingly, the planetary gears 33 can revolve around the outer periphery of the sun gear 32 while rotating about the rotational axes thereof. The planetary carrier 35 is connected to the crankshaft 26 of the engine 20. With this arrangement, the planetary gears 33 can be rotated and driven with torque transmitted from the crankshaft 26 to the planetary carrier 35.

The ring gear 34 is held in position such that it is rotatable coaxially with the sun gear 32.

As described above, the planetary gears 33 mesh with the sun gear 32 and the ring gear 34. Accordingly, when torque is transmitted from the planetary gears 33 to the sun gear 32, the sun gear 32 is rotated and driven with the torque. When torque is transmitted from the planetary gears 33 to the ring gear 34, the ring gear 34 is rotated and driven with the torque. Conversely, when torque is transmitted from the sun gear 32 to the planetary gears 33, the planetary gear 33 are rotated and driven with the torque. When torque is transmitted from the ring gear 34 to the planetary gears 33, the planetary gears 33 are rotated and driven with the torque.

The ring gear 34 is connected to the second shaft 42 of the second generator motor MG2 via a ring gear carrier 36. Accordingly, the second generator motor MG2 can generate torque to the ring gear 34. Also, the second generator motor MG2 can be rotated and driven with torque transmitted from the ring gear 34 to the second generator motor MG2 (the second shaft 42). The second generator motor MG2 can generate electric power when it is rotated and driven with torque transmitted from the ring gear 34 to the second generator motor MG2.

Furthermore, the ring gear 34 is connected to an output gear 37 via the ring gear carrier 36. Accordingly, the output gear 37 can be rotated and driven with torque transmitted from the ring gear 34 to the output gear 37. The ring gear 34 can be rotated and driven with torque transmitted from the output gear 37 to the ring gear 34.

The driving force transmission mechanism 50 includes a gear train 51, a differential gear 52, and a drive shaft 53.

The gear train 51 connects the output gear 37 with the differential gear 52 via a gear mechanism such that power can be transmitted between the output gear 37 and the differential gear 52. The differential gear 52 is provided to the drive shaft 53. Driving wheels 54 are mounted at the opposite ends of the drive shaft 53. Accordingly, torque is transmitted from the output gear 37 to the driving wheels 54 via the gear train 51, differential gear 52, and the drive shaft 53. The hybrid vehicle 10 is able to run with the torque transmitted to the driving wheels 54.

The first inverter 61 is electrically connected to the first generator motor MG1 and the battery 63. Accordingly, when the first generator motor MG1 generates electric power, the electric power generated by the first generator motor MG1 is supplied to the battery 63 via the first inverter 61. Conversely, the first generator motor MG1 is rotated and driven with electric power supplied from the battery 63 via the first inverter 61.

The second inverter 62 is electrically connected to the second generator motor MG2 and the battery 63. Accordingly, the second generator motor MG2 is rotated and driven with electric power supplied from the battery 63 via the second inverter 62. Conversely, when the second generator motor MG2 generates electric power, the electric power generated by the second generator motor MG2 is supplied to the battery 63 via the second inverter 62.

The electric power generated by the first generator motor MG1 may be directly supplied to the second generator motor MG2, and the electric power generated by the second generator motor MG2 may be directly supplied to the first generator motor MG1.

In this embodiment, the battery 63 is a lithium-ion battery. However, the battery 63 may be a nickel-metal-hydride battery or any other secondary battery provided that it is an electric storage device capable of discharge and charge.

The power management ECU 70 (which will be denoted as "PMECU 70") is connected to the battery ECU 71, motor ECU 72 and the engine ECU 73 such that information can be exchanged therebetween via communications.

The PMECU 70 is connected to a power switch 81, a shift position sensor 82, an accelerator operation amount sensor 83, a brake switch 84, and a vehicle speed sensor 85, for example. The PMECU 70 is configured to receive output signals generated by these sensors.

The power switch 81 is a switch for starting a system of the hybrid vehicle 10. The PMECU 70 starts the system (bring the system into an ON state) when a vehicle key (not shown) is inserted in a key slot (not shown), and the power switch 81 is operated while the brake pedal is being depressed. The hybrid vehicle 10 is able to run when the system is in the ON state.

The shift position sensor 82 generates a signal representing a shift position selected with a shift lever (not shown). The shift lever is placed in the vicinity of the driver's seat of the hybrid vehicle 10 such that the shift lever can be operated by the driver. The shift position is selected from P (parking position), R (reverse-drive position), N (neutral position), and D (running position).

The accelerator operation amount sensor 83 generates an output signal representing the operation amount (accelerator operation amount AP) of an accelerator pedal (not shown). The accelerator pedal is placed in the vicinity of the driver's seat of the hybrid vehicle 10 such that the accelerator pedal can be operated by the driver. The accelerator operation amount AP may also be expressed as an accelerating operation amount. The brake switch 84 generates an output signal indicating that a brake pedal (not shown) that can be operated by the driver is in an operated condition, when the brake pedal is operated. The vehicle speed sensor 85 generates an output signal representing the vehicle speed SPD of the hybrid vehicle 10.

The PMECU 70 receives the remaining capacity SOC (State Of Charge) of the battery 63 calculated by the battery ECU 71. The remaining capacity SOC is calculated by a known method, based on an integrated value of current that flows into and out of the battery 63, for example.

The PMECU 70 receives a signal representing the rotational speed of the first generator motor MG1 (which will be called "MG1 rotational speed Nm1"), and a signal representing the rotational speed of the second generator motor MG2 (which will be called "MG2 rotational speed Nm2"), via the motor ECU 72.

A resolver 96 is provided on the first generator motor MG1 and is operable to generate an output value corresponding to the angle of rotation of a rotor of the first generator motor MG1. The motor ECU 72 calculates the MG1 rotational speed Nm1, based on the output value of the resolver 96. Similarly, a resolver 97 is provided on the second generator motor MG2 and is operable to generate an output value corresponding to the angle of rotation of a rotor of the second generator motor MG2. The motor ECU 72 calculates the MG2 rotational speed Nm2, based on the output value of the resolver 97.

The PMECU 70 receives various output signals representing engine conditions, via the engine ECU 73. The output signals representing the engine conditions include the engine speed Ne, throttle opening TA, engine coolant temperature THW, and so forth.

The motor ECU 72 is connected to the first inverter 61 and the second inverter 62. The motor ECU 72 sends command signals to the first inverter 61 and the second inverter 62, based on commands ("MG1 command torque Tm1* and MG2 command torque Tm2*" which will be described later) from the PMECU 70. In this manner, the motor ECU 72 controls the first generator motor MG1 using the first inverter 61, and controls the second generator motor MG2 using the second inverter 62.

The engine ECU 73 is connected with the throttle-valve actuator 22a, in-cylinder injection valves 23, port injection valves 24, ignition devices 25, etc. which serve as engine actuators, and sends command signals to these actuators. Further, the engine ECU 73 is connected with the air flow meter 91, a throttle opening sensor 92, a coolant temperature sensor 93, an engine speed sensor 94, an air-fuel ratio sensor 95, and so forth, and obtains output signals generated by these sensors.

The air flow meter 91 measures the amount of air drawn into the engine 20 per unit time, and generates a signal representing the air amount (intake air amount) Ga. The throttle opening sensor 92 detects the opening of the throttle valve 22 (throttle opening), and generates a signal representing the detected throttle opening TA. The coolant temperature sensor 93 detects the temperature of the coolant of the engine 20, and generates a signal representing the detected coolant temperature THW. The coolant temperature THW is a parameter representing a warm-up condition of the engine 20, and is also a parameter representing the temperature of the catalyst 29.

The engine speed sensor 94 generates a pulse signal each time the crankshaft 26 of the engine 20 rotates by a given angle. The engine ECU 73 obtains the engine speed Ne based on the pulse signal. The air-fuel ratio sensor 95 is disposed at a position upstream of the upstream-side three-way catalyst 29, in the exhaust collecting portion of the exhaust manifold 27. The air-fuel ratio sensor 95 is a so-called "limiting-current type wide range air-fuel ratio sensor". The air-fuel ratio sensor 95 detects the air-fuel ratio of exhaust gas, and generates an output value Vabyfs corresponding to the detected air-fuel ratio abyfs of exhaust gas. The engine ECU 73 obtains the detected air-fuel ratio abyfs by applying the output value Vabyfs to a look-up table Mapabyfs(Vabyfs).

The engine ECU 73 sends command signals to the throttle-valve actuator 22a, in-cylinder injection valves 23, port injection valves 24, and the ignition devices 25 (in addition, the variable intake valve control device (not shown)), based on signals obtained from these sensors, and commands received from the PMECU 70, so as to control the engine 20. The engine 20 is provided with a cam position sensor (not shown). The engine ECU 73 obtains the crank angle (absolute crank angle) of the engine 20 with reference to the intake top dead center of a particular cylinder, based on signals from the engine speed sensor 94 and the cam position sensor.

Next, the operation (driving force control) of the hybrid vehicle 10 will be described. The processing as described below is executed by the CPU of the PMECU 70 and the CPU of the engine ECU 73. In the following description, the CPU of the PMECU 70 will be denoted as "PM", and the CPU of the engine ECU 73 will be denoted as "EG", for the sake of simplicity.

The system of the hybrid vehicle 10 causes torque equal to "user-requested torque" to be applied to the drive shaft 53 of the hybrid vehicle 10, by controlling the output torque of the engine 20 and the output torque of the electric motor (second generator motor MG2), while assuring the optimum efficiency of the engine 20 (namely, while operating the engine 20 at the optimum engine operation point that will be described later). The user-requested torque means "torque required to be applied to the drive shaft 53", which is determined according to the amount of accelerator operation by the user.

The system of the hybrid vehicle 10 controls the engine 20, the first generator motor MG1 and the second generator motor MG2 in association with one another. The basic content of the control is described in detail in, for example, Japanese Patent Application Publication No. 2009-126450 (JP 2009-126450 A, US Patent Application Publication No. US2010/0241297), Japanese Patent Application Publication No. 9-308012 (JP 9-308012 A, U.S. Pat. No. 6,131,680 having the U.S. filing date of Mar. 10, 1997), etc. These publications are incorporated by reference into the specification of this application.

Figure 3A:
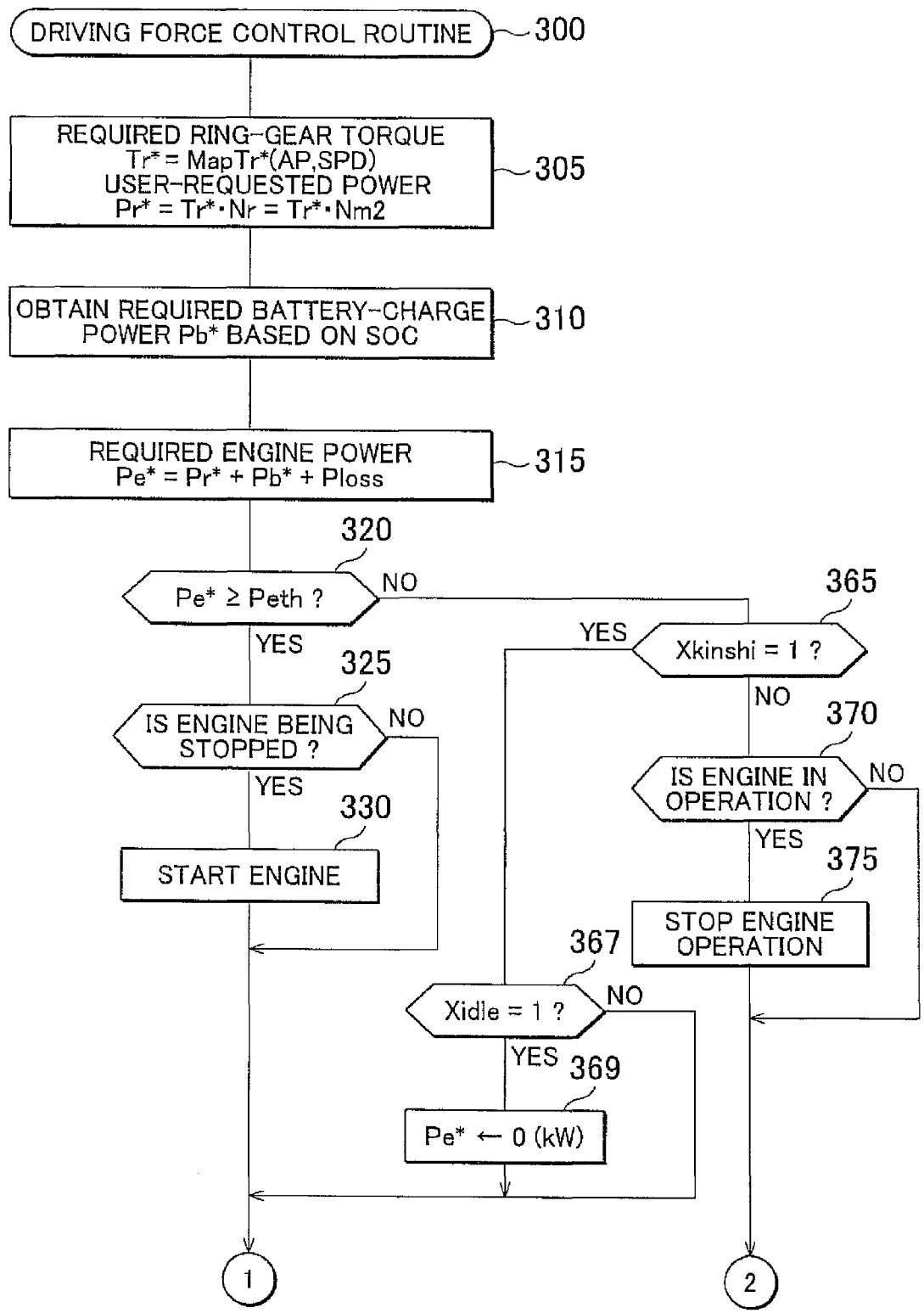
FIG. 3A is a flowchart illustrating a routine executed by CPU of a power management ECU shown in FIG. 1.
Figure 3B:
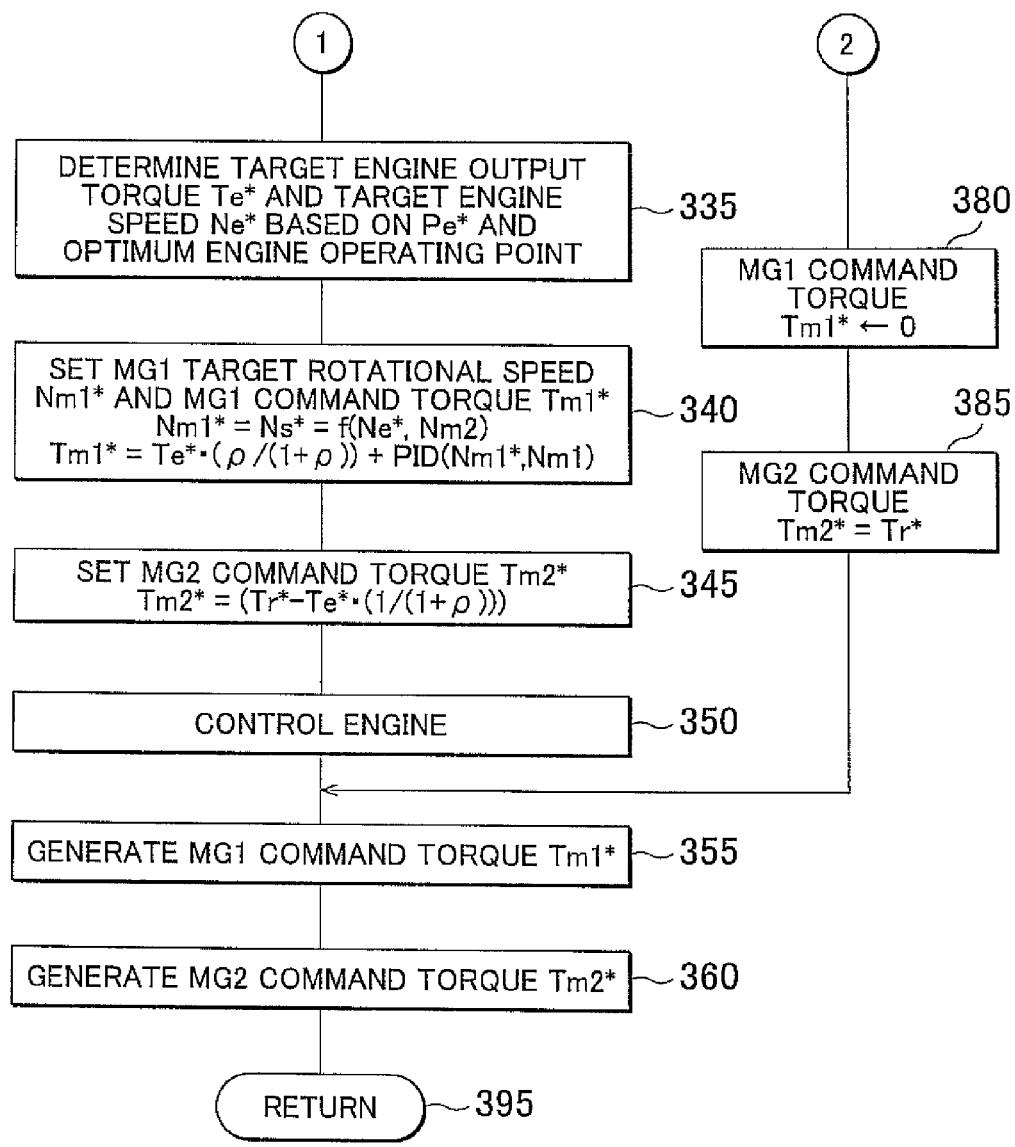
FIG. 3B is a flowchart illustrating a routine executed by CPU of a power management ECU shown in FIG. 1.

FIG. 3A and FIG. 3B are a flowchart illustrating a driving force control routine. When the shift lever is in the running position (D), the PM executes the driving force control routine at specified time intervals. Thus, the PM starts processing from step 300 of FIG. 3A at the right time, executes step 305, step 310 and step 315 as described below in the order of description, and proceeds to step 320.

Step 305: the PM obtains required ring-gear torque Tr* based on the accelerator operation amount AP and the vehicle speed SPD. Further, the PM obtains the product (Tr*×Nm2) of the required ring-gear torque Tr* and the second MG rotational speed Nm2, as user-requested power Pr*.

More specifically, torque (drive shaft torque) applied to the drive shaft 53 is proportional to torque applied to the rotary shaft of the ring gear 34. Accordingly, user-requested torque Tu* requested by the user for running the hybrid vehicle 10 is proportional to the required ring-gear torque Tr*. The user-requested torque Tu* is "torque required to be applied to the drive shaft 53", which is determined according to the accelerator operation amount AP, i.e., the amount of accelerator operation by the user.

Figure 4:
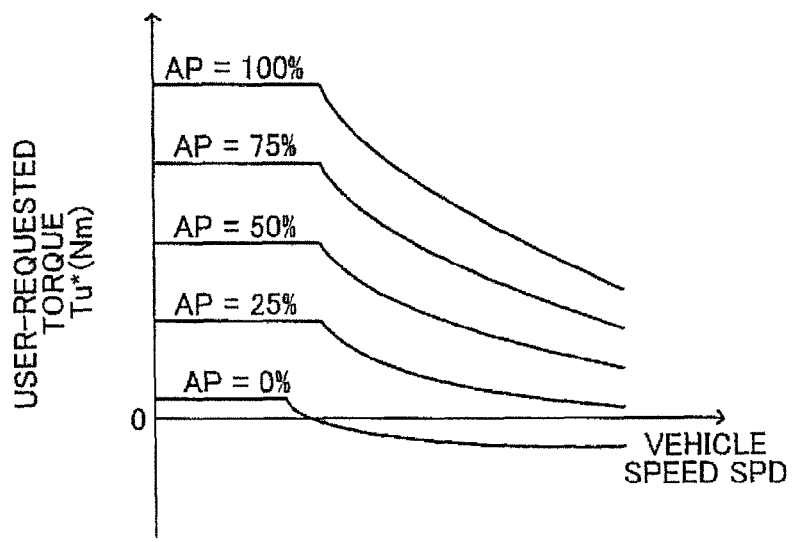
FIG. 4 is a graph indicating the relationship between the accelerator operation amount and vehicle speed, and user-requested torque.

The PM stores a table having data obtained by converting "the relationship between the accelerator operation amount AP and the vehicle speed SPD, and the user-requested torque Tu*" as shown in FIG. 4 into "the relationship between the accelerator operation amount AP and the vehicle speed SPD, and the required ring-gear torque Tr*", as a torque map MapTr*(AP, SPD), in the ROM. Then, the PM obtains the required ring-gear torque Tr*, by applying the current accelerator operation amount AP and the current vehicle speed SPD to the torque map MapTr*(AP, SPD).

In the meantime, power (user-requested power Pr*) required to be generated to the drive shaft 53 is equal to the product (Tu*×SPD) of the user-requested torque Tu* and the actual vehicle speed SPD. In this embodiment, the ring gear 34 is connected to the second shaft 42 of the second generator motor MG2 with no reduction gear interposed therebetween. Thus, the rotational speed Nr of the ring gear 34 is equal to the second MG rotational speed Nm2. Accordingly, the user-requested power Pr* (=Tu*×SPD) is equal to the product (Tr*×Nm2) of the required ring-gear torque Tr* and the second MG rotational speed Nm2.

Step 310: the PM obtains required battery-charge power Pb* based on the remaining capacity SOC. The required battery-charge power Pb* is a value corresponding to electric power to be supplied to the battery 63 so as to charge the battery 63 or electric power to be discharged from the battery 63, so that the remaining capacity SOC is kept in the vicinity of a predetermined remaining-capacity central value SOCcent.

Step 315: the PM obtains a value (Pr*+Pb*+Ploss) by adding a loss Ploss to the sum of the user-requested power Pr* and the required battery-charge power Pb*, as required engine power Pe*. The required engine power Pe* is power required to be generated from the engine 20.

Then, the PM proceeds to step S320 to determine whether the required engine power Pe* is equal to or larger than threshold required power Peth. The threshold required power Peth is set to such a value that, if the engine 20 is operated to provide power that is smaller than the threshold required power Peth, the operating efficiency (fuel efficiency) of the engine 20 becomes equal to or lower than its permissible limit (a given threshold efficiency). Namely, the threshold required power Peth is set to such a value that the highest efficiency at which the engine 20 generates power equal to the threshold required power Peth is equal to the permissible minimum value.

Case 1: the required engine power Pe* is equal to or larger than the threshold required power Peth (an engine start condition is satisfied).

In this case, the PM makes an affirmative decision (YES) in step 320, and proceeds to step 325 to determine whether the engine 20 is currently stopped (the operation is currently stopped). If the engine 20 is stopped, the PM makes an affirmative decision (YES) in step 325, and proceeds to step 330. In step 330, the PM sends a command (starting command) to start operation of the engine 20, to the EG. The EG drives a starter (not shown) and/or the first generator motor MG1, for example, based on the command, and causes fuel to be injected from the port injection valves 24, so as to start the engine 20. Thus, an engine start condition is that the required engine power Pe* is equal to or larger than the threshold required power Peth. Then, the PM proceeds to step 335. If the engine 20 is in operation, on the other hand, the PM makes a negative decision (NO) in step 325, and directly proceeds to step 335.

Step 335: the PM operates the engine 20 so that power equal to the required engine power Pe* is generated from the engine 20, and the operating efficiency of the engine 20 is optimized. Namely, the PM determines a target engine output torque Te* and a target engine speed Ne*, based on the optimum engine operating point corresponding to the required engine power Pe*.

Figure 5:
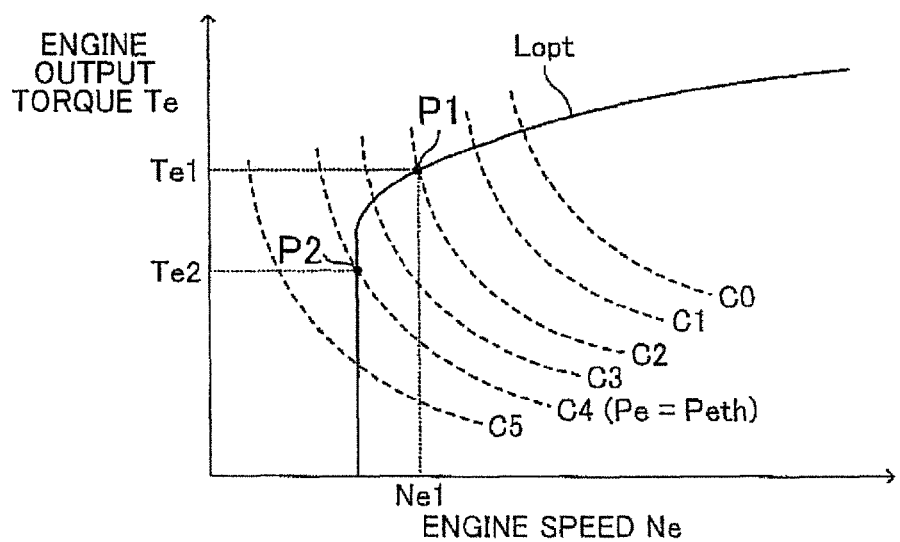
FIG. 5 is a graph indicating the relationship between the engine speed and engine output torque of the internal combustion engine, and an optimum engine operating line.

More specifically, an engine operating point at which the engine 20 operates at the highest operating efficiency (fuel efficiency) when a certain level of power is generated from the crankshaft 26 is obtained in advance by experiment, or the like, as the optimum engine operating point for each level of power. The optimum engine operating points for respective levels of power are plotted on a graph defined by the engine output torque Te and the engine speed Ne. An optimum engine operating line is obtained by connecting these optimum engine operating points plotted on the graph. In FIG. 5, the optimum engine operating line thus obtained is indicated by a solid line Lopt. In FIG. 5, each of lines C0-C5 indicated by broken lines is a line (equi-power line) that connects engine operating points at which the same power can be generated from the crankshaft 26.

The PM retrieves the optimum engine operating point at which power equal to the required engine power Pe* is obtained. Then, the PM determines the engine output torque Te and the engine speed Ne corresponding to the retrieved optimum engine operating point, as the target engine output torque Te* and the target engine speed Ne*, respectively. For example, when the required engine power Pe* is equal to power corresponding to line C2 of FIG. 5, the engine output torque Te1 corresponding to a point P1 of intersection between the line C2 and the solid line Lopt is determined as the target engine output torque Te*, and the engine speed Ne1 corresponding to the intersection point P1 is determined as the target engine speed Ne*. In this embodiment, power indicated by line C4 in FIG. 5 represents the threshold required power Peth.

Step 340: the PM calculates the MG1 target rotational speed Nm1* equal to the target rotational speed Ns* of the sun gear 32, by substituting the second MG rotational speed Nm2 equal to the rotational speed Nr of the ring gear 34, for the rotational speed Nr, and substituting the target engine speed Ne* for the engine speed Ne, in Eq. (1) as follows.

$$Ns = Nm1 = Nr - (Nr - Ne) \times (1+\rho)/\rho$$

$$(Nm1^* = Nm2 - (Nm2 - Ne^*) \times (1+\rho)/\rho) \quad (1)$$

In Eq. (1) above, "ρ" is a value defined by Eq. (2) below. Namely, "ρ" is the ratio of the number of teeth of the sun gear 32 to the number of teeth of the ring gear 34.

$$\rho = \text{(the number of teeth of the sun gear 32/the number of teeth of the ring gear 34)} \quad (2)$$

Here, the ground for the calculation according to Eq. (1) above will be explained. The relationship among the rotational speeds of respective gears of the planetary gear set 31 is indicated in a known nomographic chart shown in FIG. 6. A straight line shown in the nomographic chart is called "operating collinear line L". As is understood from the nomographic chart, the ratio $(=(Ne-Ns)/(Nr-Ns))$ of a difference $(Ne-Ns)$ between the engine speed Ne and the rotational speed Ns of the sun gear 32 to a difference $(Nr-Ns)$ between the rotational speed Nr of the ring gear 34 and the rotational speed Ns of the sun gear 32 is equal to the ratio $(=1/(1+\rho))$ of 1 to value $(1+\rho)$. Eq. (1) above is derived from the proportional relationship.

In step 340, the PM calculates the MG1 command torque Tm1* as torque to be generated by the first generator motor MG1, according to Eq. (3) below. In Eq. (3), value PID (Nm1*–Nm1) is a feedback amount corresponding to a difference between the MG1 target rotational speed Nm1* and the actual rotational speed Nm1 of the first generator motor MG1. Namely, value PID(Nm1*–Nm1) is a feedback amount for making the actual rotational speed Nm1 of the first generator motor MG1 equal to the MG1 target rotational speed Nm1*.

$$Tm1^* = Te^* \times (\rho/(1+\rho)) + \text{PID}(Nm1^* - Nm1) \quad (3)$$

Here, the ground for the calculation according to Eq. (3) above will be explained. When torque equal to the target engine output torque Te* is generated at the crankshaft 26 (namely, when the engine output torque is equal to Te*), the engine output torque Te* is converted by the planetary gear set 31. As a result, torque Tes as expressed in Eq. (4) below is applied to the rotary shaft of the sun gear 32, and torque Ter as expressed in Eq. (5) below is applied to the rotary shaft of the ring gear 34.

$$Tes = Te^* \times (\rho/(1+\rho)) \quad (4)$$

$$Ter = Te^* \times (1/(1+\rho)) \quad (5)$$

Figure 6:
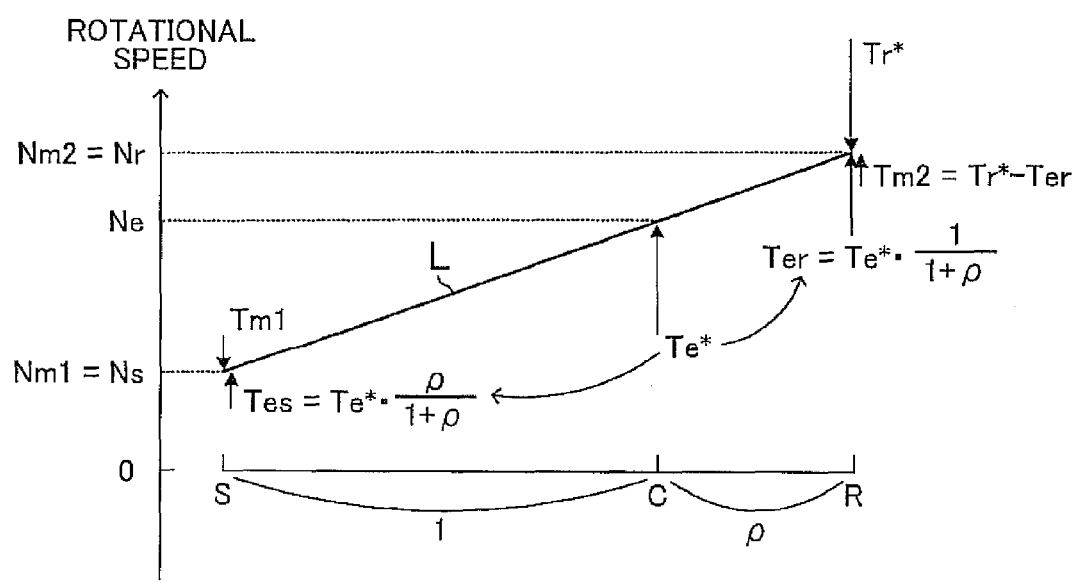
FIG. 6 is a nomographic chart of a planetary gear set during running of the hybrid vehicle shown in FIG. 1.

To make the operating collinear line stable, it is desirable to balance forces on the operating collinear line. Accordingly, as shown in FIG. 6, torque Tm1 having the same magnitude as torque Tes obtained according to Eq. (4) above but having the opposite direction is desirably applied to the rotary shaft of the sun gear 32, and torque Tm2 expressed in Eq. (6) below is desirably applied to the rotary shaft of the ring gear 34. Namely, the torque Tm2 is equal to a shortfall or shortage of torque Ter relative to the required ring-gear torque Tr*. The torque Tm2 is employed as the MG2 command torque Tm2*.

$$Tm2 = Tr^* - Ter \quad (6)$$

If the sun gear 32 rotates at the target rotational speed Ns* (if the actual rotational speed Nm1 of the first generator motor MG1 coincides with the MG1 target rotational speed Nm1*), the engine speed Ne coincides with the target engine speed Ne*. Thus, the MG1 command torque Tm1* is obtained according to Eq. (3) above.

Step 345: the PM calculates the MG2 command torque Tm2* as torque to be generated to the second generator motor MG2, according to Eq. (5) above and Eq. (6) above. The PM may also determine the MG command torque Tm2* according to Eq. (7) below.

$$Tm2^* = Tr^* - Tm1^*/\rho \quad (7)$$

Step 350: the PM sends a command signal to the EG, so that the engine output torque becomes equal to the target engine output torque Te*. As a result, the EG causes the throttle-valve actuator 22a to change the opening of the throttle valve 22, and changes the total fuel amount Ft, so as to control the engine 20 so that the engine output torque Te becomes equal to the target engine output torque Te*.

Step 355: the PM sends the MG1 command torque Tm1* to the motor ECU 72. The motor ECU 72 controls the first inverter 61 so that the output torque of the first generator motor MG1 becomes equal to the MG1 command torque Tm1*. Step 360: the PM sends the MG2 command torque Tm2* to the motor ECU 72. The motor ECU 72 controls the second inverter 62 so that the output torque of the second generator motor MG2 becomes equal to the MG2 command torque Tm2*.

Through the processing as described above, torque equal to the required ring-gear torque Tr* is applied to the ring gear 34 by means of the engine 20 and the second generator motor MG2. Further, when the remaining capacity SOC is smaller than a predetermined value SOCLoth, the power generated by the engine 20 is increased by an amount corresponding to the required battery-charge power Pb*. Accordingly, the torque Ter is increased, and therefore, the MG2 command torque Tm2* is reduced, as is understood from Eq. (6) above. As a result, electric power consumed by the second generator motor MG2, out of electric power generated by the first generator motor MG1, is reduced, and the battery 63 is charged with excess electric power generated by the first generator motor MG1 (electric power that is not consumed by the second generator motor MG2).

Case 2: the required engine power Pe* is smaller than the threshold required power Peth, and the value of an intermittent operation inhibition flag Xkinshi is not set to "1" (namely, the value of the intermittent operation inhibition flag Xkinshi is "0").

Figure 7:
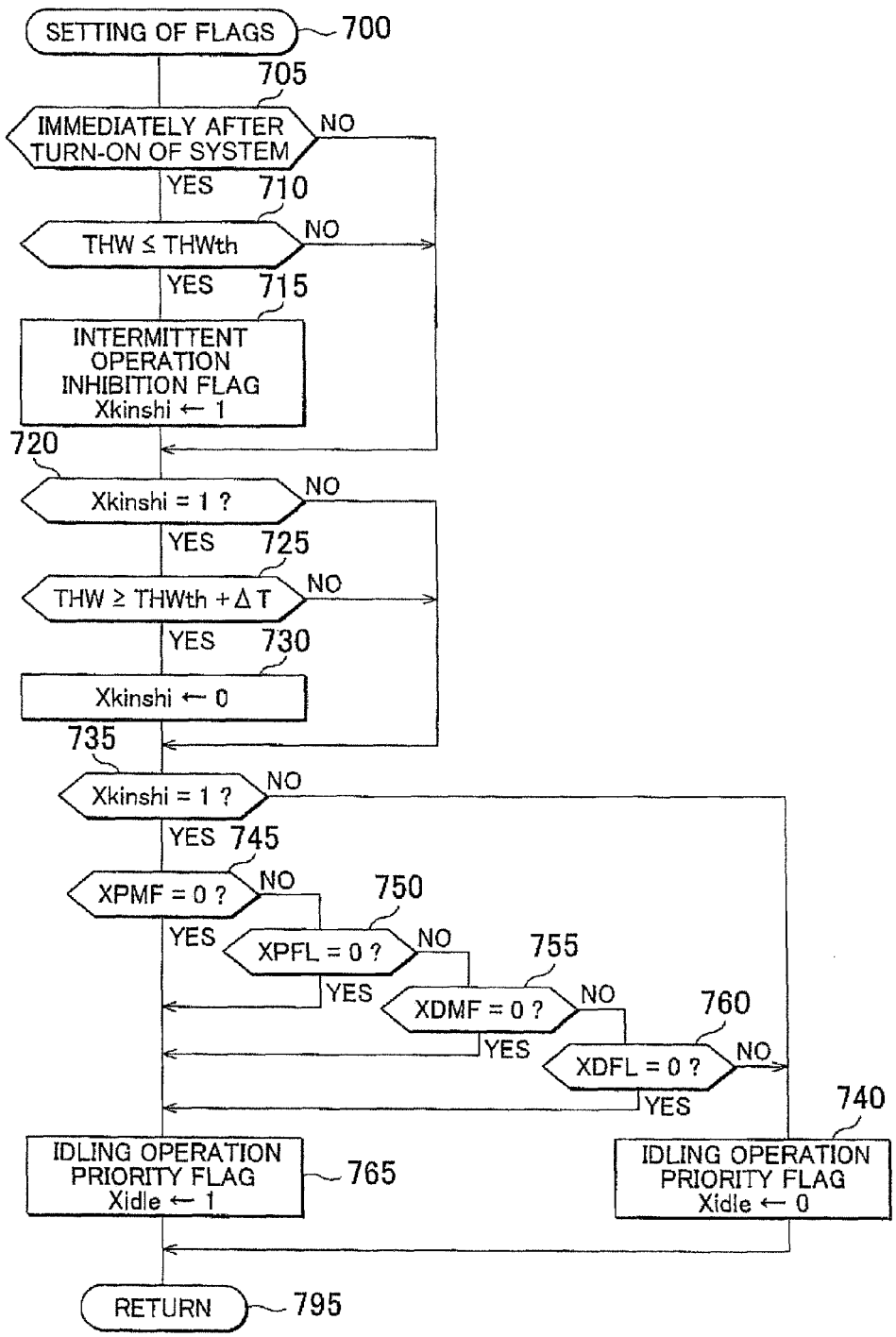
FIG. 7 is a flowchart illustrating a routine executed by CPU of an engine ECU shown in FIG. 1.

The value of the intermittent operation inhibition flag Xkinshi is set according to a flag setting routine as shown in FIG. 7, which will be described later. The value of the intermittent operation inhibition flag Xkinshi is set to "0" in the initial routine executed when the system is started (or placed in the ON state).

In Case 2, when the PM proceeds to step 320, the PM makes a negative decision (NO) in step 320, and proceeds to step 365. In step 365, the PM determines whether the value of the intermittent operation inhibition flag Xkinshi is "1".

In this case, the value of the intermittent operation inhibition flag Xkinshi is "0". Therefore, the PM makes a negative decision (NO) in step 365, and proceeds to step 370 to determine whether the engine 20 is in operation at the present time. If the engine 20 is in operation, the PM makes an affirmative decision (YES) in step 370, and proceeds to step 375. In step 375, the PM sends a command to stop the operation of the engine 20, to the EG. The EG makes the fuel injection amount (total fuel amount) equal to "0" (namely, stops fuel injection) according to this command, thereby to stop the engine 20. Then, the PM proceeds to step 380. If the engine 20 is stopped, on the other hand, the PM makes a negative decision (NO) in step 370, and directly proceeds to step 380.

Then, the PM proceeds to step 380 to set the MG1 command torque Tm1* to "0". Subsequently, the PM proceeds to step 385 to set the MG2 command torque Tm2 to the required ring-gear torque Tr*. Then, the PM executes step 355 and step 360 as described above. As a result, the required ring-gear torque Tr* (accordingly, the user-requested torque Tu*) is satisfied solely by torque generated by the second generator motor MG2.

Case 3: the required engine power Pe* is smaller than the threshold required power Peth, and the value of the intermittent operation inhibition flag is set to "1", while the value of an idling priority flag Xidle is set to "0".

In this case, when the PM proceeds to step 320, the PM makes a negative decision (NO) in step 320, and proceeds to step 365. The PM makes an affirmative decision (YES) in step 365, and proceeds to step 367. Then, the PM determines in step 367 whether the value of the idling priority flag Xidle is "1". The value of the idling priority flag Xidle is set according to a routine shown in FIG. 7, which will be described later.

In Case 3, the value of the idling priority flag Xidle is set to "0". Accordingly, the PM makes a negative decision (NO) in step 367, and directly proceeds to step 335. The PM then performs the above-described operations of step 335 through step 360. In this case, the required engine power Pe* is kept at the value determined in step 315. If the required engine power Pe* determined in step 315 is a negative value, the required engine power Pe* is set to 0 (kW).

As a result, the operation of the engine 20 is not stopped under the intermittent operation, and the required ring-gear torque Tr* (accordingly, the user-requested torque Tu*) is satisfied by the output torque of the engine 20 and the output torque of the second generator motor MG2.

Case 4: the required engine power Pe* is smaller than the threshold required power Peth, and the value of the intermittent operation inhibition flag Xkinshi is set to "1", while the value of the idling priority flag Xidle is set to "1".

In this case, the PM makes a negative decision (NO) in step 320, and proceeds to step 365. The PM makes an affirmative decision (YES) in step 365, and proceeds to step 367.

In Case 4, the value of the idling priority flag Xidle is set to "1". Accordingly, the PM makes an affirmative decision (YES) in step 367, and proceeds to step 369 to set the required engine power Pe* to 0 (kW). Then, the PM performs the above-described operations of step 335 through step 360.

When the required engine power Pe* is set to 0 (kW) in Case 3 and Case 4, the PM operates the engine 20 so that the engine 20 operates by itself, and generates substantially no torque to the crankshaft 26. At this time, the optimum operating point of the engine 20 is set to a value close to the minimum rotational speed at which the engine 20 can keep rotating; therefore, the target engine speed Ne* is set to a value (idle speed: 1000 rpm, for example) in the vicinity of the minimum rotational speed thereof. Further, since the required engine power Pe* is "0", the target engine output torque Te* is set to "0". Accordingly, the MG2 command torque Tm2* is set to a value equal to the required ring-gear torque Tr*.

Namely, when the required engine power Pe* is set to 0 (kW), the engine 20 is placed in an idling state. In other words, when the value of the idling priority flag Xidle is "1", electric power (energy) of the battery 63 is preferentially used for running the hybrid vehicle 10. As a result, the load KL of the engine 20 becomes an extremely small value (load within a predetermined load range that is equal to or smaller than a threshold value KLth). In this connection, the load KL is a value that is calculated according to Eq. (8) below, and is also called "air charge rate KL". In Eq. (8), Mc is the amount of intake air drawn into a cylinder, pair is the air density (in units of (g/l)), L is the displacement of the engine 20 (in units of (l)), and "4" is the number of cylinders of the engine 20. The throttle opening TA may be used as the load KL.

$$KL = (Mc/(\rho\mathrm{air} \times L/4)) \times 100\% \qquad (8)$$

Next, an operation (flag setting) to set the value of the intermittent operation inhibition flag Xkinshi and set the value of the idling priority flag Xidle will be described. The operation is performed by the EG. The values of these flags are transmitted via communications to the PM.

FIG. 7 is a flowchart illustrating a flag setting routine. The EG executes the flag setting routine at specified time intervals. In this routine, the values of the following flags are referred to or set: intermittent operation inhibition flag Xkinshi, idling priority flag Xidle, port injection valve misfiring abnormality determination completion flag XPMF (flag XPMF), port injection valve fuel system abnormality determination completion flag XPFL (flag XPFL), in-cylinder injection valve misfiring abnormality determination completion flag XDMF (flag XDMF), and in-cylinder injection valve fuel system abnormality determination completion flag XDFL (flag XDFL). In the initial routine as described above, the values of these flags are set to "0".

The EG starts processing from step 700 of FIG. 7 at the right time, and proceeds to step 705. In step 705, the EG determines whether the current time is immediately after the system of the hybrid vehicle 10 is placed in the ON state (immediately after the hybrid vehicle 10 becomes able to run).

At this time, if the current time is immediately after the system is placed in the ON state, the EG makes an affirmative decision (YES) in step 705, and proceeds to step 710. In step 710, the EG determines whether the coolant temperature THW is equal to or lower than a threshold coolant temperature THWth. In this embodiment, the coolant temperature THW is used as a parameter representing the temperature of the catalyst 29. The threshold coolant temperature THWth is set to a temperature level at which it is determined that the engine 20 needs to be kept operating so that the temperature of the catalyst 29 reaches its activation temperature.

If the coolant temperature THW is equal to or lower than the threshold coolant temperature THWth, the EG makes an affirmative decision (YES) in step 710, and proceeds to step 715. In step 715, the EG sets the value of the intermittent operation inhibition flag Xkinshi to "1". Then, the EG proceeds to step 720. On the other hand, if the coolant temperature THW is higher than the threshold coolant temperature THWth, the EG makes a negative decision (NO) in step 710, and directly proceeds to step 720.

In step 720, the EG determines whether the value of the intermittent operation inhibition flag Xkinshi is "1". If the value of the intermittent operation inhibition flag Xkinshi is "1", the EG makes an affirmative decision (YES) in step 720, and proceeds to step 725. In step 725, the EG determines whether the coolant temperature THW is equal to or higher than a value obtained by adding a given positive value ΔT to the threshold coolant temperature THWth. The value obtained by adding the given positive value ΔT to the threshold coolant temperature THWth is set to a temperature level at which the temperature of the catalyst 29 is expected to be kept at or around the activation temperature even if the operation of the engine 20 is stopped under the intermittent operation, as the engine 20 (and the catalyst 29) warms up. If the coolant temperature THW is equal to or higher than the value obtained by adding the given positive value ΔT to the threshold coolant temperature THWth, the EG makes an affirmative decision (YES) in step 725, and proceeds to step 730. In step 730, the EG sets the value of the intermittent operation inhibition flag Xkinshi to "0", and then proceeds to step 735.

On the other hand, if the value of the intermittent operation inhibition flag Xkinshi is not "1" when the EG executes step 720, the EG makes a negative decision (NO) in step 720, and directly proceeds to step 735. If the coolant temperature THW is lower than the value obtained by adding the given positive value ΔT to the threshold coolant temperature THWth, the EG makes a negative decision (NO) in step 725, and directly proceeds to step 735.

Thus, the intermittent operation inhibition flag Xkinshi is set to "1" when the coolant temperature THW measured immediately after the system is placed in the ON state is equal to or lower than the threshold coolant temperature THWth. Then, the intermittent operation inhibition flag Xkinshi is set to "0" when the coolant temperature THW becomes equal to or higher than the value obtained by adding the given positive value ΔT to the threshold coolant temperature THWth.

In step 735, the EG determines whether the value of the intermittent operation inhibition flag Xkinshi is "1". If the value of the intermittent operation inhibition flag Xkinshi is not "1" (is equal to "0"), the EG makes a negative decision (NO) in step 735, and proceeds to step 740. In step 740, the EG sets the value of the idling priority flag Xidle to "0". Then, the EG proceeds to step 795, and once finishes the routine of FIG. 7.

On the other hand, if the value of the intermittent operation inhibition flag Xkinshi is "1", the EG makes an affirmative decision (YES) in step 735, and proceeds to step 745. In step 745, the EG determines whether the value of the flag XPMF is "0". The value of the flag XPMF is set to "1" when a misfiring abnormality determination concerning the port injection valve 24 has been made, according to a routine illustrated in FIG. 9A and FIG. 9B, which will be described later.

When the value of the flag XPMF is "1", the EG makes a negative decision (NO) in step 745, and proceeds to step 750. In step 750, the EG determines whether the value of the flag XPFL is "0". The value of the flag XPFL is set to "1" when a fuel system abnormality determination concerning the port injection valve 24 has been made, according to the routine illustrated in FIG. 9A and FIG. 9B.

When the value of the flag XPFL is "1", the EG makes a negative decision (NO) in step 750, and proceeds to step 755. In step 755, the EG determines whether the value of the flag XDMF is "0". The value of the flag XDMF is set to "1" when a misfiring abnormality determination concerning the in-cylinder injection valve 23 has been made, according to the routine illustrated in FIG. 9A and FIG. 9B.

When the value of the flag XDMF is "1", the EG makes a negative decision (NO) in step 755, and proceeds to step 760. In step 760, the EG determines whether the value of the flag XDFL is "0". The value of the flag XDFL is set to "1" when a fuel system abnormality determination concerning the in-cylinder injection valve 23 has been made, according to the routine illustrated in FIG. 9A and FIG. 9B.

When the value of the flag XDFL is "1", the EG makes a negative decision (NO) in step 760, and proceeds to step 740. In step 740, the EG sets the value of the idling priority flag Xidle to "0". Then, the EG proceeds to step 795, to once finish the routine of FIG. 7.

Thus, when the value of the intermittent operation inhibition flag Xkinshi is "0", the value of the idling priority flag Xidle is set to "0". Also, when the value of the intermittent operation inhibition flag Xkinshi is "1", and all of the values of the flag XPMF, flag XPFL, flag XDMF and the flag XDFL are "1", the value of the idling priority flag Xidle is set to "0".

On the other hand, if the value of the flag XPMF is "0", the EG makes an affirmative decision (YES) in step 745, and proceeds to step 765. In step 765, the EG sets the value of the idling priority flag Xidle to "1".

Similarly, if the value of the flag XPFL is "0", the EG makes an affirmative decision (YES) in step 750, and proceeds to step 765. If the value of the flag XDMF is "0", the EG makes an affirmative decision (YES) in step 755, and proceeds to step 765. In addition, if the value of the flag XDFL is "0", the EG makes an affirmative decision (YES) in step 760, and proceeds to step 765.

Namely, in the case where the value of the intermittent operation inhibition flag Xkinshi is "1", if at least one of the values of the flag XPMF, flag XPFL, flag XDMF and flag XDFL is "0", the value of the idling priority flag Xidle is set to "1". As a result, even if the required engine power Pe* is smaller than the threshold required power Peth, the operation of the engine 20 is continued. In this case, the required engine power Pe* is set to "0".

Figure 8:
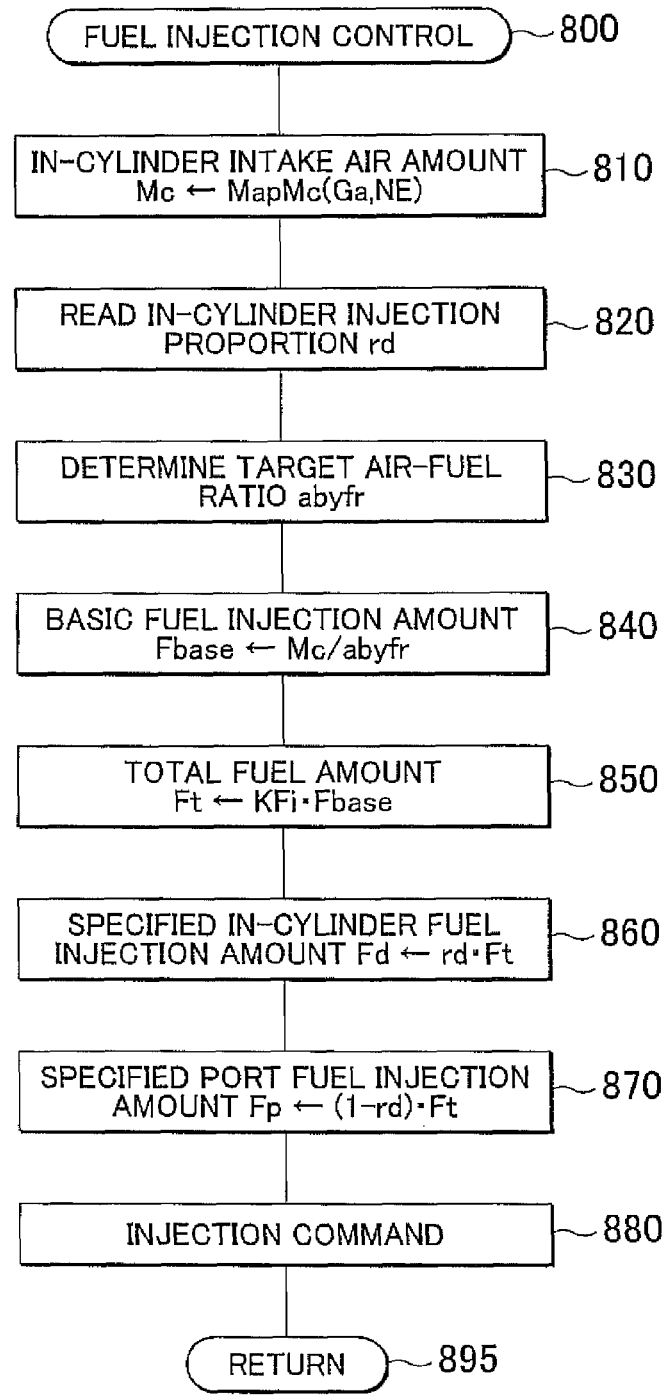
FIG. 8 is a flowchart illustrating a routine executed by the CPU of the engine ECU shown in FIG. 1.

Next, the fuel injection amount control of the engine will be briefly described. FIG. 8 is a flowchart illustrating a fuel injection control routine. The EG executes the fuel injection control routine at specified time intervals. Accordingly, the EG starts processing from step 800 of FIG. 8 at the right time, executes step 810 through step 880 as described below, in the order of description, and proceeds to step 895 to once finish this routine.

Step 810: the EG obtains an in-cylinder intake air amount Mc, based on the intake air amount Ga and the engine speed Ne. The in-cylinder intake air amount Mc is an amount of air to be drawn into a cylinder that is entering into the intake stroke next, during one intake stroke. In step 810, the EG uses a table MapMc(Ga, Ne). Step 820: the EG reads an in-cylinder injection proportion (direct injection proportion) rd. The in-cylinder injection proportion rd is a proportion of the amount of fuel to be injected from the in-cylinder injection valve 23 (specified in-cylinder fuel injection amount Fd) to the overall amount of fuel to be injected (supplied) into the engine 20 (the total fuel amount Ft). Also, the in-cylinder injection proportion rd is separately determined by a routine illustrated in FIG. 9A and FIG. 9B. Step 830: the EG determines a target air-fuel ratio abyfr. The target air-fuel ratio abyfr is set to the stoichiometric air-fuel ratio stoich except for special cases, such as after start of the engine and during cold operation of the engine.

Step 840: the EG calculates a basic fuel injection amount Fbase by dividing the in-cylinder intake air amount Mc by the target air-fuel ratio abyfr. Step 850: the EG calculates the total fuel amount Ft by multiplying the basic fuel injection amount Fbase by an air-fuel ratio feedback amount KFi. The air-fuel ratio feedback amount KFi is a correction amount for Making the detected air-fuel ratio abyfs equal to the target air-fuel ratio abyfr (the stoichiometric air-fuel ratio stoich), and is separately calculated according to a routine (not shown). The air-fuel ratio feedback amount is reduced when the detected air-fuel ratio abyfs is smaller (richer) than the target air-fuel ratio abyfr, and is increased when the detected air-fuel ratio abyfs is larger (leaner) than the target air-fuel ratio abyfr. The basic value (which does not increase nor reduce the basic fuel injection amount Fbase) of the air-fuel ratio feedback amount KFi is "1".

Step 860: the EG determines the specified in-cylinder fuel injection amount Fd by multiplying the total fuel amount Ft by the in-cylinder injection proportion rd. Step 870: the EG determines the specified port fuel injection amount Fp by multiplying the total fuel amount Ft by a value (1−rd). Step 880: the EG sends a command to the port injection valve 24 so that the fuel is injected in the specified port fuel injection amount Fp from the port injection valve 24 corresponding to the cylinder that is entering into the intake stroke, at an appropriate time. Further, the EG sends a command to the in-cylinder injection valve 23 so that the fuel is injected in the specified in-cylinder fuel injection amount Fd from the in-cylinder injection valve 23 corresponding to the above-indicated cylinder, at an appropriate time.

Figure 9A:
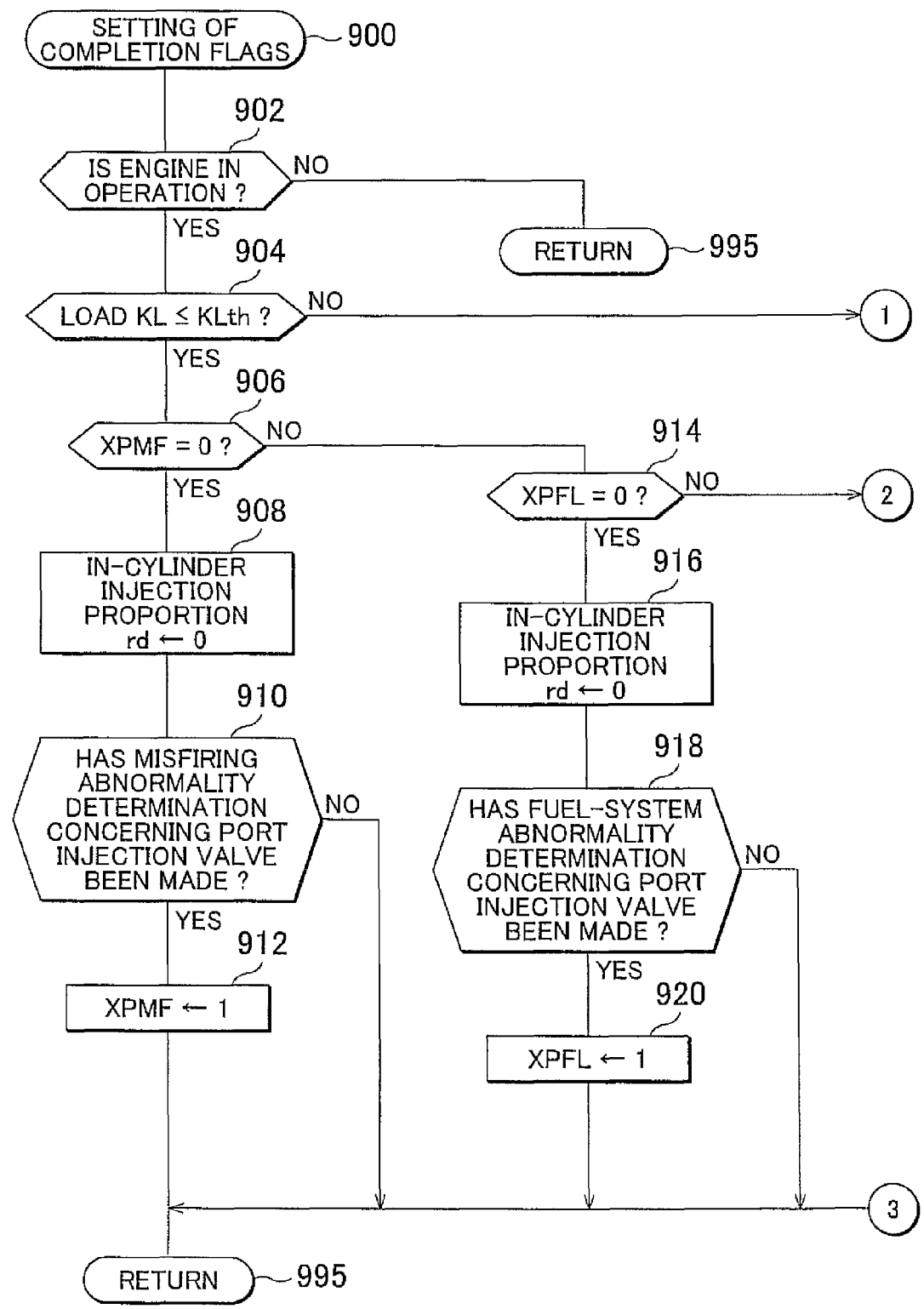
FIG. 9A is a flowchart illustrating a routine executed by the CPU of the engine ECU shown in FIG. 1.
Figure 9B:
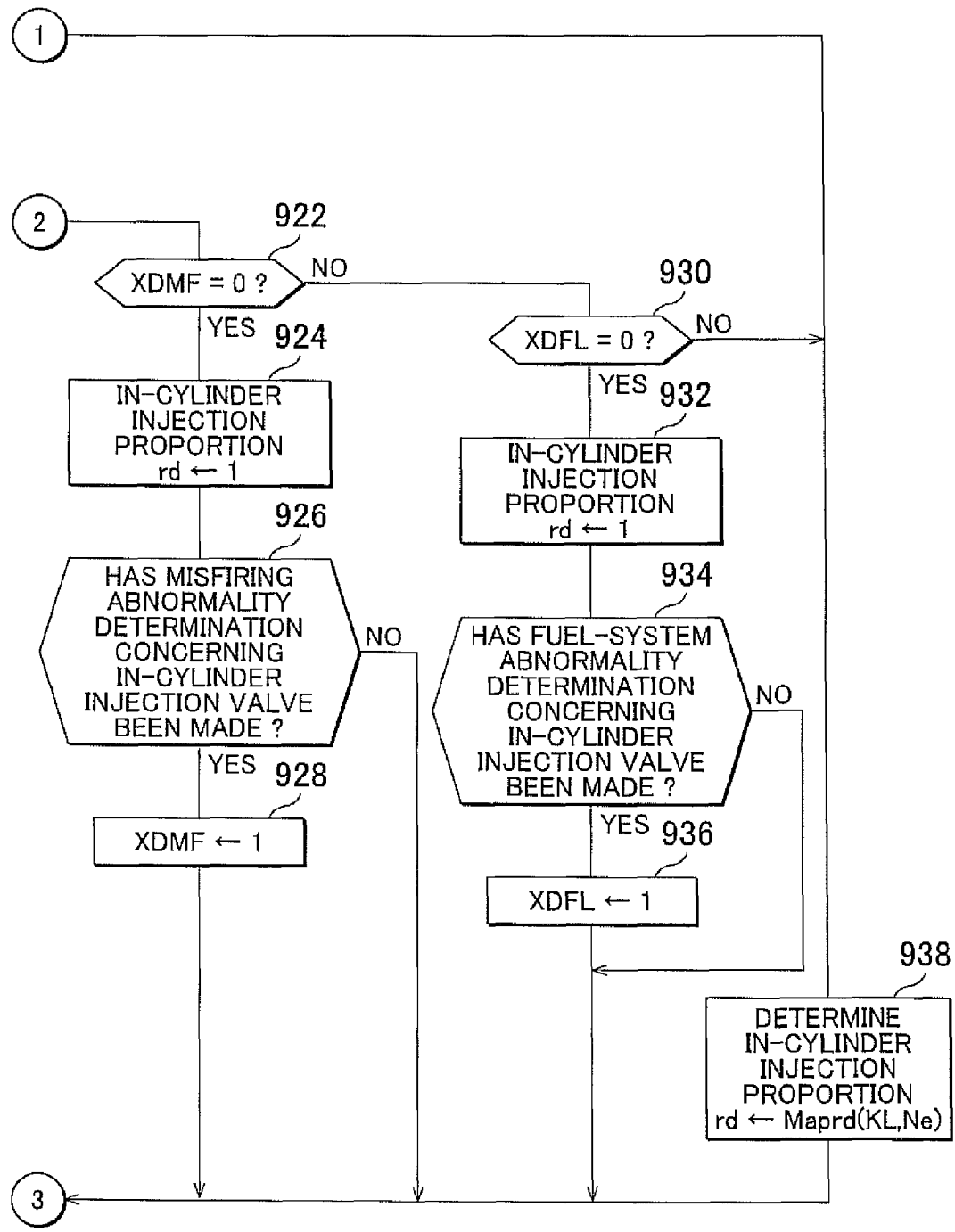
FIG. 9B is a flowchart illustrating a routine executed by the CPU of the engine ECU shown in FIG. 1.

Next, the operation of the EG when setting the flag XPMF, flag XPFL, flag XDMF, flag XDFL and determining the in-cylinder injection proportion rd will be described. FIG. 9A and FIG. 9B are a flowchart illustrating a routine for setting completion flags and determining the injection proportion. The EG executes the routine for setting completion flags and determining the injection proportion at specified time intervals.

The EG starts processing from step 900 of FIG. 9A at the right time, and proceeds to step 902 to determine whether the engine 20 is in operation. If the engine 20 is not in operation at this time, the EG makes a negative decision (NO) in step 902, and directly proceeds to step 995 to once finish this routine.

On the other hand, if the engine 20 is in operation, the EG makes an affirmative decision (YES) in step 902, and proceeds to step 904. In step 904, the EG determines whether the load KL of the engine 20 is equal to or smaller than the threshold load KLth. In other words, the EG determines whether the load KL is within the predetermined load range (light-load range).

The threshold load KLth is set to a value substantially equal to the load KL at which the engine 20 is operated at point P2 shown in FIG. 5. Namely, the threshold load KLth is set to a value substantially equal to the load KL at which the engine 20 generates power equal to the threshold required power Peth indicated by line C4 while being operated at the optimum engine operating point. Step 904 may be replaced by another step in which it is determined whether the required engine power Pe* is equal to "0". The EG proceeds to step 906 when the required engine power Pe* is equal to "0", and proceeds to step 938 when the required engine power Pe* is larger than "0".

In the following, the case where the load KL is equal to or smaller than the threshold load KLth will be described. In this case, the EG makes an affirmative decision (YES) in step 904, and proceeds to step 906.

In step 906, the EG determines whether the value of the flag XPMF is "0" so as to determine whether a misfiring abnormality determination concerning the port injection valve has been made. If a misfiring abnormality determination concerning the port injection valve has not been made, and the value of the flag XPMF is "0", the EG makes an affirmative decision (YES) in step 906, and proceeds to step 908 to set the in-cylinder injection proportion rd to "0". As a result, the total amount Ft of fuel is injected from the port injection valve 24 (see step 860 and step 870 of FIG. 8).

Then, the EG proceeds to step 910, and determines whether a misfiring abnormality determination concerning the port injection valve has been made according to a routine (not shown). A misfiring abnormality associated with the port injection valve 24 is determined in the following manner, for example. Namely, when the load KL is equal to or smaller than the threshold load KLth (the load KL is within the predetermined light-load range), and the total amount Ft of fuel is injected from the port injection valve 24 (no fuel is injected from the in-cylinder injection valve 23), the EG obtains a length of time Tθ required for the crankshaft 26 of the engine 20 to rotate a given angle θ (e.g., 180°) each time the crankshaft 26 rotates θ degrees, over a given period of time. Then, the EG determines that there is no misfiring abnormality associated with the port injection valve 24 when the range of variations in a plurality of time lengths Tθ thus obtained is within a permissible range, and determines that there is a misfiring abnormality associated with the port injection valve 24 when the range of variations in the obtained time lengths Tθ exceeds the permissible range.

If a misfiring abnormality determination concerning the port injection valve has not been made, the EG makes a negative decision (NO) in step 910, and directly proceeds to step 995 to once finish the routine of FIG. 9. On the other hand, if a misfiring abnormality determination concerning the port injection valve has been made, the EG makes an affirmative decision (YES) in step 910, and proceeds to step 912. In step 912, the EG sets the value of the flag XPMF to "1". Then, the EG proceeds to step 995 to once finish this routine.

If the value of the flag XPMF is set to "1", the EG makes a negative decision (NO) in step 906 in subsequent cycles, and proceeds to step 914. In step 914, the EG determines whether the value of the flag XPFL is "0" so as to determine whether a fuel-system abnormality determination concerning the port injection valve has been made. If a fuel-system abnormality determination concerning the port injection valve has not been made, and the value of the flag XPFL is "0", the EG makes an affirmative decision (YES) in step 914, and proceeds to step 916. In step 916, the EG sets the in-cylinder injection proportion rd to "0". As a result, the total amount Ft of fuel is injected from the port injection valve 24 (see step 860 and step 870 of FIG. 8).

Then, the EG proceeds to step 918, and determines whether a fuel-system abnormality determination concerning the port injection valve has been made according to a routine (not shown). A fuel-system abnormality associated with the port injection valve 24 is determined in the following manner, for example. Namely, when the load KL is equal to or smaller than the threshold load lath, and the total amount Ft of fuel is injected from the port injection valve 24 (no fuel is injected from the in-cylinder injection valve 23), while the air-fuel ratio feedback control is being executed, the EG determines that a fuel-system abnormality occurred to the port injection valve 24 when the average value of the air-fuel ratio feedback correction amounts KFi obtained over a given period of time is equal to or larger than a given value $(1+\gamma)$ that is larger than 1 or equal to or smaller than a given value $(1-\gamma)$ that is smaller than 1. On the other hand, when the average value of the air-fuel ratio feedback correction amounts KFi obtained in the above conditions is larger than the given value $(1-\gamma)$ and smaller than the given value $(1+\gamma)$, the EG determines that no fuel-system abnormality occurs to the port injection valve 24. The value $\gamma$ is, for example, 0.35.

If a fuel-system abnormality determination concerning the port injection valve has not been made, the EG makes a negative decision (NO) in step 918, and directly proceeds to step 995 to once finish the routine of FIG. 9. On the other hand, if a fuel-system abnormality determination concerning the port injection valve has been made, the EG makes an affirmative decision "YES" in step 918, and proceeds to step 920. In step 920, the EG sets the value of the flag XPFL to "1". Then, the EG proceeds to step 995 to once finish this routine.

If the value of the flag XPFL is set to "1", the EG makes a negative decision (NO) in step 914, and proceeds to step 922. In step 922, the EG determines whether the value of the flag XDMF is "0", so as to determine whether a misfiring abnormality determination concerning the in-cylinder injection valve has been made. If a misfiring abnormality determination concerning the in-cylinder injection valve has not been made, and the value of the flag XDMF is "0", the EG makes an affirmative decision (YES) in step 922, and proceeds to step 924. In step 924, the EG sets the in-cylinder injection proportion rd to "1". As a result, the total amount Ft of fuel is injected from the in-cylinder injection valve 23 (see step 860 and step 870 of FIG. 8).

Then, the EG proceeds to step 926 to determine whether a misfiring abnormality determination concerning the in-cylinder injection valve has been made according to a routine (not shown). A misfiring abnormality associated with the in-cylinder injection valve 23 is determined in substantially the same manner as that in which a misfiring abnormality associated with the port injection valve 24 is determined, except that the determination is made in a condition where the total amount Ft of fuel is injected from the in-cylinder injection valve 23 (no fuel is injected from the port injection valve 24).

If a misfiring abnormality determination concerning the in-cylinder injection valve has not been made, the EG makes a negative decision (NO) in step 926, and directly proceeds to step 995 to once finish the routine of FIG. 9. On the other hand, if a misfiring abnormality determination concerning the in-cylinder injection valve has been made, the EG makes an affirmative decision (YES) in step 926, and proceeds to step 928. In step 928, the EG sets the value of the flag XDMF to "1". Then, the EG proceeds to step 995 to once finish this routine.

If the value of the flag XDMF is set to "1", the EG makes a negative decision (NO) in step 922 in subsequent cycles, and proceeds to step 930. In step 930, the EG determines whether the value of the flag XDFL is "0" so as to determine whether a fuel-system abnormality determination concerning the in-cylinder injection valve has been made. If a fuel-system abnormality determination concerning the in-cylinder injection valve has not been made, and the value of the flag XDFL is "0", the EG makes an affirmative decision (YES) in step 930, and proceeds to step 932. In step 932, the EG sets the in-cylinder injection proportion rd to "1". As a result, the total amount Ft of fuel is injected from the in-cylinder injection valve 23 (see step 860 and step 870 of FIG. 8).

Then, the EG proceeds to step 934, and determines whether a fuel-system abnormality determination concerning the in-cylinder injection valve has been made according to a routine (not shown). A fuel-system abnormality associated with the in-cylinder injection valve 23 is determined in substantially the same manner as that in which a fuel-system abnormality associated with the port injection valve 24 is determined, except that the determination is made in a condition where the total amount Ft of fuel is injected from the in-cylinder injection valve 23 (in a condition where no fuel is injected from the port injection valve 24).

If a fuel-system abnormality determination concerning the in-cylinder injection valve has not been made, the EG makes a negative decision (NO) in step 934, and directly proceeds to step 995 to once finish the routine of FIG. 9. On the other hand, if a fuel-system abnormality determination concerning the in-cylinder injection valve has been made, the EG makes an affirmative decision (YES) in step 934, and proceeds to step 936. In step 936, the EG sets the value of the flag XDFL to "1". Then, the EG proceeds to step 995 to once finish this routine.

If the value of the flag XDFL is set to "1", the EG makes a negative decision (NO) in step 930 in subsequent cycles, and proceeds to step 938. In step 938, the EG determines the in-cylinder injection proportion rd, based on the load KL and the engine speed Ne. In addition, when the load KL is larger than the threshold load KLth, the EG makes a negative decision (NO) in step 904, and proceeds to step 938. In step 938, the EG determines the in-cylinder injection proportion rd, based on the load KL and the engine speed Ne. Thereafter, the EG proceeds to step 995 to once finish the routine of FIG. 9.

As described above, the hybrid vehicle 10 according to this embodiment includes a power transmission mechanism (30, 50, etc.) and a driving force control unit. The power transmission mechanism couples the drive shaft 53 of the vehicle 10 with the engine 20 (crankshaft 26) such that torque can be transmitted therebetween, and couples the drive shaft 53 with the electric motor (second generator motor MG2) such that torque can be transmitted therebetween. The driving force control unit performs normal operation (see step 305 through step 315, step 335 through step 360 of FIG. 3A) to control and adjust the output torque of the engine 20 and the output torque of the electric motor (second generator motor MG2) so as to apply torque equal to the user-requested torque Tu* to the drive shaft 53. The user-requested torque Tu* is "torque required to be applied to the drive shaft 53", which is determined according to the amount AP of accelerator operation by the user. For example, the driving force control unit operates the engine so that the operating efficiency of the engine is optimized (by operating the engine with torque and engine speed corresponding to those of the optimum engine operating point, so that the operating efficiency of the engine becomes equal to or higher than a given operating efficiency). At this time, the driving force control unit controls the electric motor so that the output torque of the electric motor makes up for torque that is short of the user-requested torque when the output torque of the engine is applied to the drive shaft.

The driving force control unit stops operation of the engine 20 when a certain engine operation stop condition is satisfied (see step 320, and step 365 through step 375 of FIG. 3). Then, the driving force control unit adjusts the output torque of the second generator motor MG2, so as to apply the torque equal to the user-requested torque Tu* to the drive shaft (see step 385 of FIG. 3A). Namely, the user-requested torque Tu* is applied to the drive shaft. Also, when a certain engine operation start condition is satisfied, the driving force control unit starts the engine 20 (see step 320 through step 330 of FIG. 3A). Thus, the driving force control unit performs engine intermittent operation. For example, the engine operation stop condition is satisfied when the user-requested torque is small and the operating efficiency of the engine is lower than a given operating efficiency.

The hybrid vehicle 10 further includes an abnormality determining unit that makes in-cylinder injection valve abnormality determinations (step 924, step 926, step 932 and step 934 of FIG. 9B), and port injection valve abnormality determinations (see step 908, step 910, step 916, step 918, etc. of FIG. 9A). The abnormality determining unit determines whether an abnormality occurs to the in-cylinder injection valve 23 while the total amount of fuel included in an air-fuel mixture supplied to the engine 20 is injected from the in-cylinder injection valve 23. The abnormality determining unit makes port injection valve abnormality determinations when it does not make in-cylinder injection valve abnormality determinations. The abnormality determining unit determines whether an abnormality occurs to the port injection valve 24 while the total amount of fuel included in an air-fuel mixture supplied to the engine 20 is injected from the port injection valve 24.

The driving force control unit further includes an intermittent operation inhibiting unit (see step 365 of FIG. 3A in which an affirmative decision (YES) is made, step 335 through step 360 of FIG. 3B, step 367 and step 369 of FIG. 3A), and an operation executing unit for abnormality determination (see step 365, step 367, step 369 of FIG. 3A, and step 335 through step 360 of FIG. 3B). When a certain intermittent operation inhibiting condition is satisfied (when the value of the intermittent operation inhibition flag Xkinshi is "1", see step 705 through step 730 of FIG. 7), the intermittent operation inhibiting unit inhibits execution of the engine intermittent operation, and keeps operating the engine 20. When at least one of the in-cylinder injection valve abnormality determinations and the port injection valve abnormality determinations has not been made (see step 735 through step 765 of FIG. 7, when the value of the idling priority flag Xidle is "1"), during the period in which the engine is kept operating due to inhibition of execution of the engine intermittent operation, the operation executing unit for abnormality determination operates the engine 20 so that the load of the engine 20 falls within a predetermined load range.

For example, the intermittent operation inhibiting condition may be satisfied when a warm-up condition of the engine has not reached a given warm-up condition after the system of the hybrid vehicle is started (when the coolant temperature is equal to or lower than the threshold coolant temperature), or may be satisfied when a heating request for increasing the temperature in the compartment of the hybrid vehicle by utilizing heat generated by the engine is generated. Also, when the engine includes a catalyst (e.g., three-way catalyst) for purifying exhaust gas, the operation of the engine is inhibited from being stopped under the intermittent operation, until the warm-up condition of the engine reaches a given warm-up condition (in other words, until the temperature of the catalyst reaches a given temperature level), so that the catalyst exhibits its catalytic function or performance at an early opportunity. In other words, the intermittent operation inhibiting condition is satisfied when the operation of the engine should be inhibited from being stopped under the intermittent operation for any purpose other than to make it possible to make fuel injection valve abnormality determinations.

Further, the abnormality determining unit makes the in-cylinder injection valve abnormality determinations and the port injection valve abnormality determinations (see step 910 and step 918 of FIG. 9A, step 926 and step 934 of FIG. 9B) when the load KL of the engine 20 is within the predetermined load range (see step 904 of FIG. 9A).

Accordingly, in the hybrid vehicle 10, if one or more of the in-cylinder injection valve abnormality determinations and the port-injection valve abnormality determinations has/have not been made, during the period in which the engine intermittent operation is inhibited for any purpose other than to make fuel injection valve abnormality determinations (in this embodiment, for the purpose of promoting warm-up of the catalyst 29, namely, when there is a request for warming up the engine and the catalyst), the load of the engine 20 is set to be within the predetermined load range (irrespective of the operating efficiency of the engine). The predetermined load range is set to a range in which the in-cylinder injection valve abnormality determinations and port injection valve abnormality determinations can be made. Thus, an injection valve abnormality determination can be made when a general intermittent operation inhibiting condition is satisfied. It is thus possible to make an abnormality determination concerning the fuel injection valves, utilizing a condition where the operation of the engine is inhibited from being stopped for warm-up of the catalyst, without inhibiting the engine from being stopped under the intermittent operation for the purpose of making the abnormality determination concerning the fuel injection valves.

It is to be understood that the present invention is not limited to the illustrated embodiment, but various modified examples may be employed within the scope of the invention. For example, the hybrid vehicle may be any vehicle (vehicle capable of intermittent operation) in which output torque of the engine and output torque of the electric motor are controlled so that torque equal to the user-requested torque can be applied to the drive shaft 53, and operation of the engine can be stopped depending on operating conditions of the vehicle. Further, the method of determining an injection valve abnormality is not limited to the above-described method, but may be selected from various known methods of determining injection valve abnormalities.

The above-indicated engine operation stop condition may be a condition that "the required engine power Pe* is equal to or larger than the threshold required power Peth". The engine start condition may be a condition that "the required engine power Pe* is equal to or larger than a required start-up power that is larger than the threshold required power Peth". In addition, the hybrid vehicle 10 may be a vehicle that makes only a misfiring abnormality determination concerning the port injection valve 24 and a misfiring abnormality determination concerning the in-cylinder injection valve 23 as injection valve abnormality determinations. Also, the hybrid vehicle 10 may be a vehicle that makes only a fuel-system abnormality determination concerning the port injection valve 24 and a fuel-system abnormality determination concerning the in-cylinder injection valve 23 as injection valve abnormality determinations.

The value of the intermittent operation inhibition flag Xkinshi may be set to "1" when the engine 20 needs to be kept operating so as to increase the temperature in the compartment of the hybrid vehicle 10, for example. In another example, the value of the intermittent operation inhibition flag Xkinshi may be set to "1" when the remaining capacity SOC is significantly reduced (the remaining capacity SOC is equal to or smaller than a threshold value of permissible minimum remaining capacity which is smaller than the central value SOCcent of the remaining capacity), and the engine 20 needs to be forced to operate so as to quickly increase the remaining capacity SOC.

While the required engine power Pe* is set to 0 (kW) in step 369 of FIG. 3A, the required engine power Pe* may be set to a given value other than 0 in step 369, provided that the load of the engine 20 is set to be within the load range in which fuel injection valve abnormality determinations can be made.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A hybrid vehicle, comprising:
an internal combustion engine including an in-cylinder injection valve that directly injects fuel into a combustion chamber, and a port injection valve that injects the fuel into an intake port that communicates with the combustion chamber;
an electric motor;
a power transmission mechanism that couples a drive shaft of the hybrid vehicle with the internal combustion engine so that torque can be transmitted therebetween, and couples the drive shaft with the electric motor so that torque can be transmitted therebetween;
a driving force control unit that performs (i) normal operation to control output torque of the internal combustion engine and output torque of the electric motor so as to apply torque required to be applied to the drive shaft, which is determined according to an amount of accelerator operation by a user, to the drive shaft, and performs (ii) engine intermittent operation to stop operation of the internal combustion engine and control the output torque of the electric motor so that the required torque is applied to the drive shaft when determining that a given condition for stopping operation of the internal combustion engine is satisfied, and start the internal combustion engine when determining that a given condition for starting the internal combustion engine is satisfied; and
an abnormality determining unit that makes an in-cylinder injection valve abnormality determination as to whether an abnormality occurs to the in-cylinder injection valve while causing a total amount of fuel included in an air-fuel mixture supplied to the internal combustion engine to be injected from the in-cylinder injection valve, and makes a port injection valve abnormality determination as to whether an abnormality occurs to the port injection valve while causing the total amount of fuel included in the air-fuel mixture to be injected from the port injection valve, wherein:
the driving force control unit includes an intermittent operation inhibiting unit that inhibits execution of the engine intermittent operation and keeps operating the internal combustion engine when a given condition for inhibiting execution of the engine intermittent operation is satisfied, and an operation executing unit that operates the internal combustion engine so that a load of the internal combustion engine falls within a predetermined range, when at least one of the in-cylinder injection valve abnormality determination and the port injection valve abnormality determination has not been made, during a period in which execution of the engine intermittent operation is inhibited whereby the internal combustion engine is kept operating; and
the abnormality determining unit makes the in-cylinder injection valve abnormality determination and the port injection valve abnormality determination, when the load of the internal combustion engine falls within the predetermined range.

2. The hybrid vehicle according to claim 1, wherein the abnormality determining unit makes the port injection valve abnormality determination when the in-cylinder injection valve abnormality determination is not being made.

3. The hybrid vehicle according to claim 1, wherein the operation executing unit operates the internal combustion engine so that the load of the internal combustion engine becomes equal to or smaller than an upper limit load of the predetermined range, when at least one of the in-cylinder injection valve abnormality determination and the port injection valve abnormality determination has not been made, during the period in which execution of the engine intermittent operation is inhibited whereby the internal combustion engine is kept operating, and
the abnormality determining unit makes the in-cylinder injection valve abnormality determination and the port injection valve abnormality determination, when the load of the internal combustion engine is equal to or smaller than the upper limit load of the predetermined range.

4. The hybrid vehicle according to claim 1, wherein the driving force control unit determines that the condition for inhibiting the engine intermittent operation is satisfied, when a warm-up condition of the engine has not reached a given warm-up condition after a system of the hybrid vehicle is started.

* * * * *